(12) United States Patent
Nielsen et al.

(10) Patent No.: US 9,900,275 B2
(45) Date of Patent: Feb. 20, 2018

(54) TRACKING OBJECT ACROSS PROCESSES

(71) Applicant: Apple Inc., Cupertino, CA (US)

(72) Inventors: Benjamin E. Nielsen, Sunnyvale, CA (US); Jonathan E. Drummond, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 15/007,085

(22) Filed: Jan. 26, 2016

(65) Prior Publication Data

US 2016/0352665 A1 Dec. 1, 2016

Related U.S. Application Data

(60) Provisional application No. 62/169,538, filed on Jun. 1, 2015.

(51) Int. Cl.
*H04L 29/08* (2006.01)
*H04L 12/58* (2006.01)
(Continued)

(52) U.S. Cl.
CPC .............. *H04L 51/10* (2013.01); *G06F 11/30* (2013.01); *G06F 11/3006* (2013.01);
(Continued)

(58) Field of Classification Search
CPC ......... H04L 29/08099; H04L 29/08135; H04L 1/1635; H04L 51/30; H04L 69/164; H04L 67/08; H04L 67/02; H04L 63/0227; H04L 12/00; G06F 11/30; G06F 11/3006; G06F 9/541; G06F 9/5072; G06F 9/45533; G06F 21/10; G06F 21/105; H04H 60/31
See application file for complete search history.

(56) References Cited

U.S. PATENT DOCUMENTS 8,887,250 B2 * 11/2014 Kuzin ..................... H04L 67/08
726/5
9,348,678 B1 * 5/2016 Chandrasekhar ....... G06F 9/541
(Continued)

*Primary Examiner* — Le H Luu
(74) *Attorney, Agent, or Firm* — Womble Bond Dickinson (US) LLP

(57) ABSTRACT

Systems and methods are disclosed for tracking the lifecycle of an object across processes and for tracking the lifecycle of processes that are processing the object. A first process, P1 can generate an Action object representing work to be performed by another process, $P_N$. The Action object can carry a payload of arbitrary information, an action handler, a handle to a response queue, and a timeout value. A token set can be requested from a kernel of an operating system. A first token in the set can be held by one process at a time. The kernel enforces that rule. The kernel can track the location of the first token. A copy of the Action object is viable for sending a response if it holds the first token. An Action Listener within P1 holds the second token of the set and uses it to validate a response received by P1 from a remote process. The remote process performs the work of the Action object and guarantees a response back to P1, through the kernel, without passing the response back through intervening processes P2 through $P_{N-1}$.

21 Claims, 16 Drawing Sheets

(51) Int. Cl.
*H04L 1/16* (2006.01)
*G06F 11/30* (2006.01)

(52) U.S. Cl.
CPC ...... *H04L 1/1635* (2013.01); *H04L 29/08099* (2013.01); *H04L 29/08135* (2013.01); *H04L 51/30* (2013.01)

(56) References Cited

U.S. PATENT DOCUMENTS

| | | | | |
|---|---|---|---|---|
| 2009/0327094 | A1* | 12/2009 | Elien | G06F 21/10 |
| | | | | 705/26.1 |
| 2010/0146085 | A1* | 6/2010 | Van Wie | H04L 12/00 |
| | | | | 709/220 |
| 2012/0233612 | A1* | 9/2012 | Beckett | G06F 9/45533 |
| | | | | 718/1 |
| 2012/0331300 | A1* | 12/2012 | Das | H04L 69/164 |
| | | | | 713/176 |
| 2014/0006951 | A1* | 1/2014 | Hunter | H04H 60/31 |
| | | | | 715/719 |
| 2014/0282586 | A1* | 9/2014 | Shear | G06F 9/5072 |
| | | | | 718/104 |
| 2014/0317405 | A1* | 10/2014 | Johnson | H04L 63/0227 |
| | | | | 713/164 |
| 2015/0235015 | A1* | 8/2015 | Holler | G06F 21/105 |
| | | | | 726/27 |
| 2015/0326453 | A1* | 11/2015 | Bishop | H04L 67/02 |
| | | | | 709/224 |

* cited by examiner

TRACKING OBJECT ACROSS PROCESSES

RELATED APPLICATIONS

This application claims priority under 35 U.S.C. § 119(e) of U.S. Patent Application No. 62/169,538, filed Jun. 1, 2015, and entitled "TRACKING OBJECT ACROSS PROCESSES," which is incorporated herein by reference to the extent that it is consistent with this disclosure.

TECHNICAL FIELD

This disclosure relates to the fields of inter-process communications and tracking processing actions across process boundaries and across processing systems.

BACKGROUND

In a multi-processing computing environment, a first process can request that a second process perform work on behalf of the first process. The second process can further request that a third process perform work on behalf of the first process. In an example, a first process may be an email process. A user may be viewing an email representing a Facebook® friend request notification, the email having an embedded link for the user to accept the friend request. The user can then click on the embedded link in the email, triggering a call to the second process to launch a web browser using the link. The third process may be an application at the link, such as a Facebook® application, that is launched within the browser. A response from the Facebook® application may include a message to the user that the friend request has been successfully accepted. The response message can be passed from the third process to the second process, and in turn passed from the second process to the first process for further processing, such as displaying the message to the user.

In the above example, a response back to the first process is not guaranteed. Because the third process passes a response to the first process via the second process, the first process will not receive a response if the second process is no longer running. Further, the third process may never return a response if it cannot complete the work to be performed for the first process. For example, if the third process is a Facebook® server that launches the Facebook® application, the first process will never receive a response if the Facebook® server is down. Thus, in both cases, the first process will never receive a response from the user clicking on the link in the email.

SUMMARY OF THE DESCRIPTION

Embodiments are described for tracking an object across processes that guarantees a response by a remote process performing work on behalf of a first process. An Action object can represent work that a first process wants performed. The first processes can pass the Action object through one or more processes, in a sequence, to reach a process that is capable of performing the work in the Action object. A response to the first process can be guaranteed to reach the first process, from the remote process that performed the work, even if any of the intervening processes between the first process and the remote process fails. The response can be passed from the remote process, through the kernel, to the first process, without passing the response through the intervening processes.

In a first embodiment, a method of tracking an object across processes includes generating, by a first process P1, an object representing an item of work to be performed by a remote process $P_N$. The first process can receive a token set associated with the first process P1. The token set can include a first token and a second token such that only one process at a time can hold the first token. The method can include transferring the object and the first token to the remote process $P_N$ for processing. The method can further include receiving, through an operating system kernel, the first token and a response to the object from the remote process $P_N$. The response can be validated using the first token and the second token. In an embodiment, the remote process can be a second process. In another embodiment, the remote process can be a third process that received the first token and a copy of the object from a second, intervening process. The first process can receive the first token and a response to the object remote (e.g. third) process, via the kernel, without passing the response through the second, intervening process. In an embodiment, the kernel can enforce the requirement that only one process at a time can hold the first token. The method can further include generating, by the first process, a listener object that can receive the response to the object. The listener object can hold the second token of the token set. In an embodiment, the listener object can also validate the response received from the remote process by comparing the second token (held by the listener object) and the first token (received in the response). The first token can be a kernel "read right" and the second token can be a kernel "send right," forming a set that is generated by the kernel. The kernel can maintain an association between the first process, the first token, and the second token. In an embodiment, another trusted authority than the kernel can provide the token set and enforce the rule that only one process can hold the first token.

In an embodiment, a method can detect whether a first process has terminated while waiting on a response from a second process. The first process can generate a new Action object. The first process can request and receive, e.g. from a kernel, a token set including a first and second token, wherein the first token can be held by only one process at a time. In an embodiment, the kernel can enforce the rule that the first token can only be held by one process at a time. The first process can further generate a listener object that is linked to the Action object and that can listen for a response to the Action object. The Listener object can hold the first token in the first process. The first process can encode a message containing the Action object, a payload and the second token for transmission to the second process. The kernel can track the process that is currently holding the first token and the process that is holding the second token. The second process can register with the kernel to receive a message from the kernel in the event that the first token indicates that the first process has terminated. The first process can transmit the encoded message containing the Action object, payload and second token to the second process. In embodiment, the second token can be transferred to the second process by the kernel. The second process can then decode the message from the first process, create a copy of the Action object, and begin performing work represented within the Action object. If the first token indicates that the first process has terminated, then the second process can receive a notification from the kernel that the first process has terminated. In an embodiment, the first process can cancel the Action by requesting that the kernel terminate, deallocate, destroy, or otherwise invalidate the first token such that the second process can receive a notification from the kernel that the first the Action object is no longer active. Accordingly, the second process can stop processing the copy of the Action object and deallocate the copy of the Action object. In an embodiment, the kernel can deallocate the set of tokens.

In another embodiment, a method can detect that a second process, that is performing work on behalf of a first process, has terminated. A first process can generate a new Action object. The first process can request and receive a token set from the kernel. The token set can include a send right ("SR") token and a receive right ("RR") token. In an embodiment, the first process can register with the kernel to receive a notification if the first token is held by a process that terminates. The kernel can enforce a rule that the first token can only be held by one process at a time. The first process can encode the new Action object, a payload, the first token within a message. The first process can link the Action object to an Action Listener object. The first process can then send the message with the first token to a second process. In an embodiment, the connection can be an inter-process communication connection. A kernel can transfer the first token from the first process to the second process. The second token can be retained in the first process. In an embodiment, the second token can be held in the first process by the Action Listener. The second process can receive the encoded message from the first process. The second process can decode the message and generate a copy of the Action object within the message, and begin performing the work described in the copy of the Action object. The kernel can detect whether the process that holds the first token has terminated. If the second process terminates, then the second process will never return a response message to the first process. Accordingly, the first process can unlink the Action object from the Action Listener in the first process. The first process can also deallocate the Action object in the first process because no response will be forthcoming from the copy of the Action object in the terminated second process.

In another embodiment a non-transitory computer readable can store executable instructions, that when executed by a processing system, can perform any of the method functionality described above.

In yet another embodiment, a processing system coupled to a memory programmed with executable instructions can, when the instructions are executed by the processing system, perform any of the method functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment can include transferring one or more function calls, messages, other types of invocations or parameters via the API.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for a first process to request that a second process, or any subsequent process in a sequence of processes (termed, "remote process") to perform work on behalf of the first process and for the remote process to securely provide a guaranteed response to the first process, without passing the response through any intervening processes in the sequence.

Figure 1:
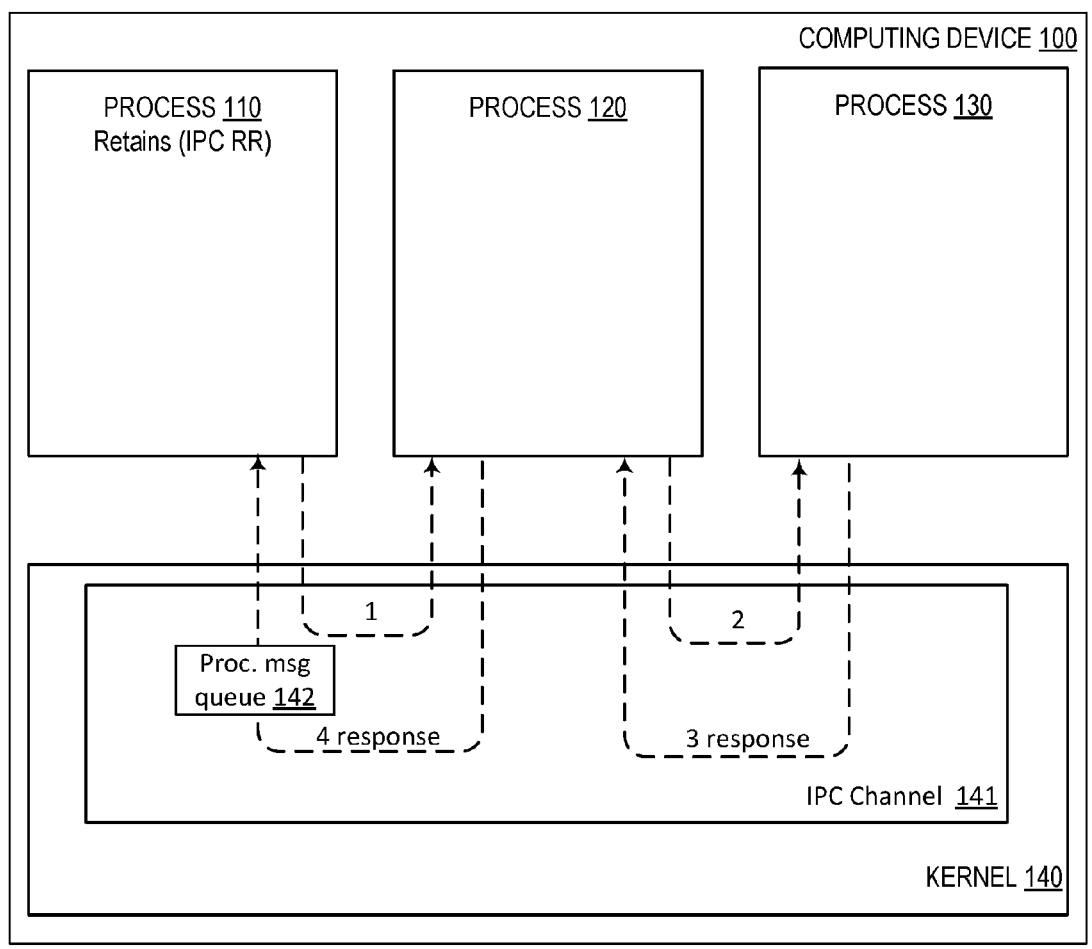
FIG. 1 illustrates, in block form, inter-process communication of the prior art.

FIG. 1 illustrates, in block diagram form, a communication flow 100 across processes in a multi-processing computing system as is known in the prior art.

A computing system 100 can comprise a first process 110, a second process 120, and a third process 130, and a kernel 140. When first process 110 calls second process 120 to perform work on behalf of first process 110, then an inter-process communication (IPC) channel 141 is opened. An IPC channel is used for sending messages between processes and is managed by kernel 140. An IPC channel has attributes "send right" (SR) and "receive right" (RR). These rights are administered by the kernel 140 during message passing between processes. The holder of the receive right RR can open and read a message queue 142. Here, process 110 holds the receive IPC receive right RR so that it can dequeue, read, and act upon messages sent to process 110 over IPC channel 141 via process message queue 142.

IPC calls and responses are daisy-chained from originating process 110, to called process 120, to process 130 (called by process 120 on behalf of process 110), and back from process 130, through process 120 to process 110. When process 110 calls process 120 to perform work on behalf of process 110, using call 1, then kernel 140 can transfer or assign a send right SR to process 120 so that process 120 has a right to send a response message to process 110. When process 120 calls process 130 to perform work for process 120 (on behalf of process 110), using call 2, then kernel 140 again transfers or assigns a send right to process 130 so that process 130 can return a response message to process 120. In response message 3, process 130 returns a response and can transfer the IPC send right SR to process 120. Similarly, in a response message 4, process 120 returns a response to process 110 in response to original call 1.

If process 120 terminates before process 120 receives and forwards a response message from process 130, then process 110 will never receive a response. Thus, in the prior art, there is no guarantee that process 110 will ever receive a response to its initial call 1, for at least the reason that process 120 is required for relaying a response from process 130 to process 110, and process 120 is not guaranteed to be running when process 130 responds to call 2 from process 120.

Figure 2A:
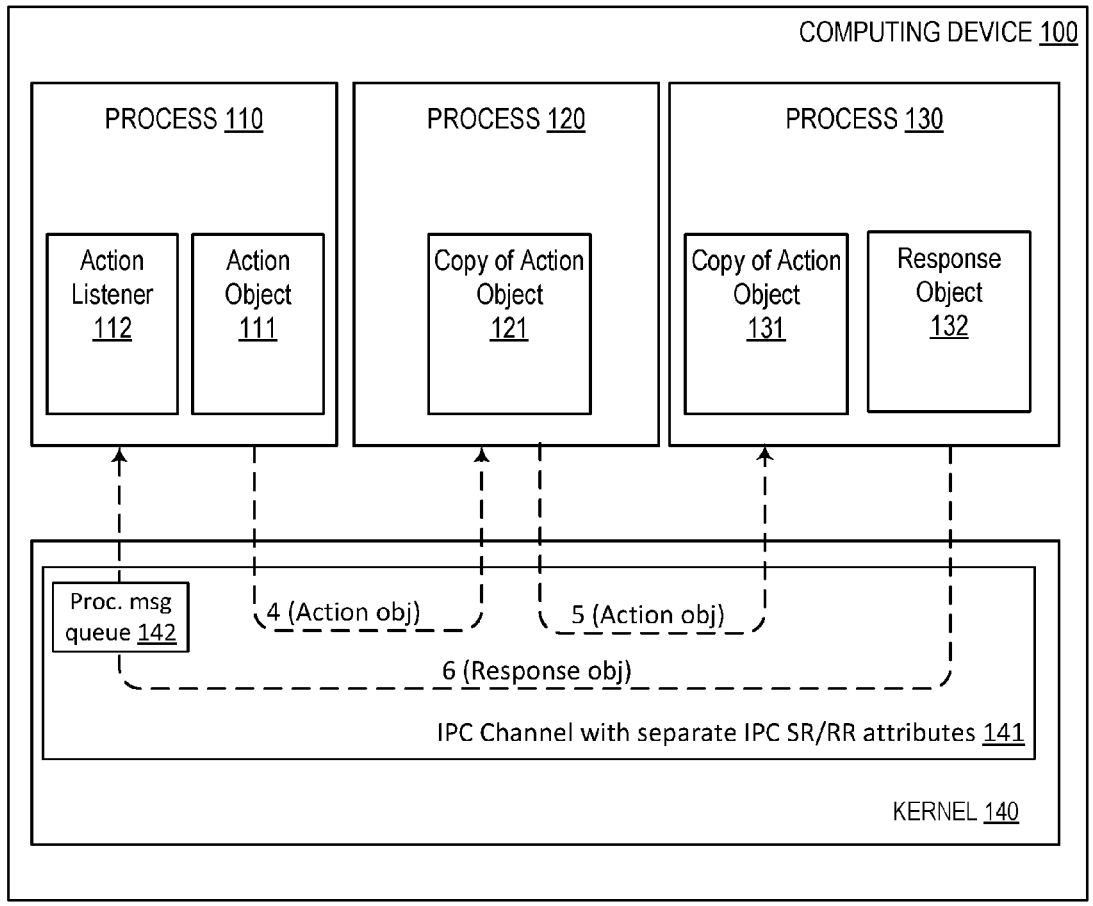
FIG. 2A illustrates, in block form, a system for tracking an object across processes that guarantees a response in a secure and efficient manner.

FIG. 2A illustrates, in block form, a system for tracking objects across processes in a computing system 100 that guarantees a response from a called process, e.g. 130, to a calling process 110, in a secure and efficient manner. In FIG. 2, inter-process communication ("IPC") channel 141 can use an IPC "send right" ("SR") to indicate that a process (e.g. process 120 or 130) has permission from kernel 140 to send a message to message queue 142 of an originating process (e.g. process 110). A corresponding "receive right" ("RR") can be used to indicate that a process has the right to open and read a message queue. In IPC, an initial calling process, e.g. process 110, typically holds the receive right RR for IPC channel 141. Other processes may be granted a send right SR to send messages to the initial calling process. Kernel 140 can enforce the uniqueness of a read right RR; there can be only one RR in an RR/SR set. There may be a plurality of send rights SR corresponding to read right RR.

In FIG. 2A, an Action object 111 can request a new RR/SR token set from a trusted arbiter. In an embodiment, the trusted arbiter can be kernel 140. Kernel 140 can register the Action RR/SR token set with the requesting process, here process 110. The requested Action RR/SR token set is distinct from the IPC RR/SR rights set and performs a different function. The IPC RR/SR rights set manages IPC channel 141 communication rights. The Action RR/SR token set tracks the life cycle of copies of an Action object, e.g. 111, 121, and 131, across processes. Kernel 140 enforces uniqueness of an RR token in any RR/SR set. Since kernel 140 only permits one RR token per token set, the RR token can be transferred with an Action object to indicate that the Action object is the single viable copy of the Action object 111 as it is passed to a remote process to perform work on behalf of the process that originated Action object 111 (here, process 110). The Action object 111 and Action Listener 112 can use any token that enforces uniqueness of one token in the token set. A kernel port RR/SR set is simply a convenient and available choice that is managed by the kernel 140 in a predictable way. Thus, for the Action object token set, the textual meaning of SR (send right) and RR (receive right) is not significant to tracking objects across processes. The significance of the RR/SR token set is that the kernel 140 enforces the rule that only one process can hold the RR token for the Action object at any one time. The Action RR can be transferred between process, but the Action RR cannot be simultaneously held by two or more different processes. The copy of the Action object that holds the RR is the one viable copy of the Action object that is able to send a response back to the originating process that first instantiated the Action object, here process 110.

In addition, use of the kernel RR token as an indicator of the one viable copy of an Action enhances security because a kernel RR token cannot be copied. Thus, the kernel RR token cannot be falsified ("spoofed") by a hacker.

When a first process, e.g. process 110, wants a second process 120 to perform work on behalf of process 110, then process 110 instantiates an Action object 111. Action object 111 can be instantiated with a time out, a handle to a response queue, an IPC endpoint, a remote action handler, and a payload. A payload can be information that Action object may use or act upon in performing the work of the Action object. E.g., a payload can be a Uniform Resource Locator ("URL") to be passed from an application (first process) to a web browser (second process).

Process 110 can instantiate and register Action Listener 112 with the kernel 140. In an embodiment, process 110 can instantiate Action Listener 112 when process 110 begins encoding Action object 111 for passing in a message to process 120. Action Listener 112 can listen for a response from a remote copy of Action object 111, e.g. copy of Action object 121 or 131. Action Listener 112 can hold the Action SR token corresponding to the unique Action RR in the RR/SR token set initially requested by Action object 111. Here, the Action RR token is currently held by Action object 111. In an embodiment, there need only be one Action Listener 112 for all Action objects instantiated in a given process.

Process 110 can transmit encoded Action object 111 to process 120, requesting that work be performed by process 120 on behalf of process 110. When process 110 transmits Action object 111 to process 120, kernel 140 can transfer the unique Action RR token from process 110 to process 120 in the encoded message containing Action object 111. The Action SR token is still held Action Listener 121 in process 110.

After the encoded message has been passed from process 110 to process 120, the Action RR token is held by the Copy of the Action Object 121 in process 120. Action object 111 has transferred away its unique token: Action RR. Thus, Action object 111 is no longer a viable copy of the Action object. The current viable copy of Action object is now copy of Action object 121, because it holds unique token: Action RR.

Process 120 can then pass its Copy of Action Object 121 to process 130 to perform work on behalf of process 110. Kernel 140 again enforces uniqueness of the Action RR token and transfers the Action RR token to process 130. Copy of Action Object 121 has transferred away its unique token: Action RR. Thus, Copy of Action object 121 is no longer a viable copy of Action object 111. The current viable copy of Action object 111 is now Copy of Action object 131, because it holds the unique token: Action RR. The Action SR token is still held in process 110 by Action Listener 112.

Process 130 can perform the work requested by Copy of Action object 131. Process 130 can then generate a Response Object 132 for encoding and sending back a response to process 110. Process 130 includes unique token Action RR within the Response Object 132, and transmits Response Object 132 to Action Listener 112 in process 110 over IPC call 6. Kernel 140 again enforces uniqueness of the Action RR token and transfers Action RR token back to process 110. Copy of Action Object 131 is no longer a viable copy of Action object 111 because Copy of Action Object 131 has transferred away its unique token: Action RR to process 110.

Process 110 receives and decodes Response Object 132 having the Action RR token. Action Listener 112 is still holding the Action SR token, since the time that Action object 111 was first instantiated and requested the RR/SR token set from kernel 140. Action Listener can compare the Action SR token with the Action RR token in the received response object 132 from process 130. Action Listener 112 uses the received Action RR token to compare with the stored Action SR token for this Action object, to validate that the received response is truly a response to the original Action object 111 initiated by process 110.

Figure 2B:
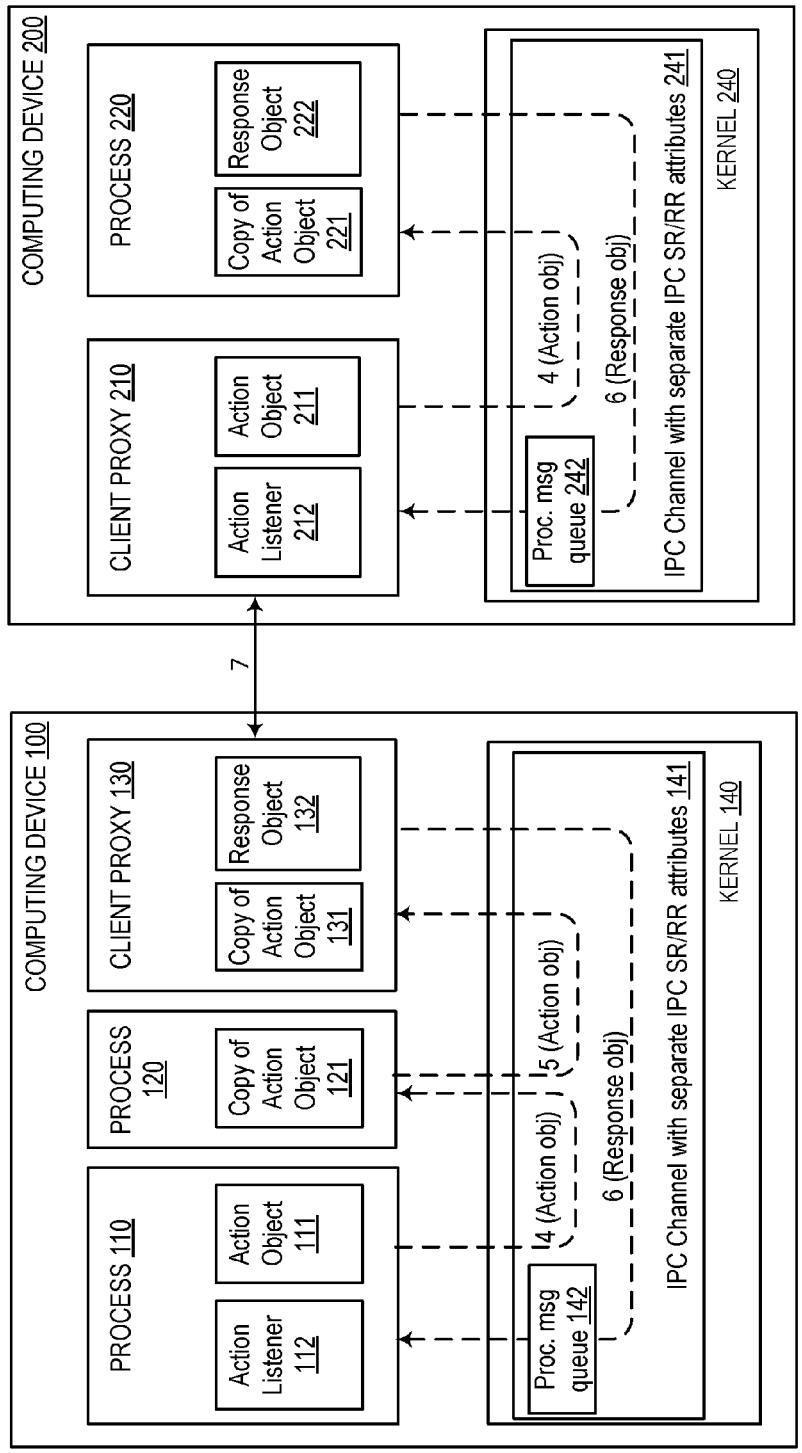
FIG. 2B illustrates, in block form, a system for tracking an object across processes and devices in a secure and efficient manner.

FIG. 2B illustrates, in block form, a system for tracking an object across processes and across devices 100 and 200. In this embodiment, a trusted communication channel 7 can be established between client proxy process 130 on device 100 and client proxy process 210 on device 200. The trusted communication channel 7 can be used to pass a copy of Action object 111 from the first device 100 to the second device 200 so that client device 200 can perform work embodied in a copy of the Action object 111. Lifecycle of the Action object, and its copies 121 and 131, can be tracked across processes using a token pair administered by a trusted source, such as kernel 140, using inter-process communication (IPC) channel 141 on device 100 and kernel 241 on device 200.

In FIG. 2B, IPC channel 141 can use an IPC "send right" ("SR") to indicate that a process (e.g. process 120 or client proxy 130 on device 100) has permission from kernel 140 to send a message to message queue 142 of an originating process (e.g. process 110). A corresponding "receive right" ("RR") can be used to indicate that a process has the right to open and read a message queue. In IPC, an initial calling process, e.g. process 110, typically holds the receive right RR for IPC channel 141. Other processes may be granted a send right SR to send messages to the initial calling process. Kernel 140 can enforce the uniqueness of a read right RR; there can be only one RR in an RR/SR set. There may be a plurality of send rights SR corresponding to read right RR.

In FIG. 2B, an Action object 111 in process 110 can request a new RR/SR token set from a trusted arbiter. In an embodiment, the trusted arbiter can be kernel 140. Kernel 140 can register the Action RR/SR token set with the requesting process, here process 110. The requested Action RR/SR token set can be distinct from the IPC RR/SR rights set and performs a different function. The IPC RR/SR rights set manages IPC channel 141 communication rights. The Action object RR/SR token set tracks the life cycle of copies of an Action object, e.g. 111, 121, and 131, across processes 110, 120, and client proxy process 130 of device 100.

A client proxy process 130 can establish communication channel 7 between device 100 and device 200. In an embodiment, the communication channel 7 is a secure communication channel. In an embodiment, the communication channel 7 can include a time-out, a watchdog, or a "ping" between client proxy 130 on device 100 and client proxy 210 on device 200. The communication channel 7 can determine whether client proxy 130 or client proxy 210 has terminated. In an embodiment, client proxy 130 can tolerate client proxy 210 terminating and restarting. In such an embodiment, client proxy 130 can determine that client proxy 210 has terminated, if client proxy 210 fails to reestablish communication with client proxy 130 within a predetermined period of time (e.g., a "time-out value") after client proxy 130 loses communication with client proxy 210. In an embodiment, communications from client proxy 130 to client proxy 210 can include a universally unique identifier (UUID) of device 100 so that client proxy 210 on device 200 can verify that a received communication originated from device 100. In an embodiment, communications from client proxy 130 to client proxy 210 can further include the RR token of action object 131. Similarly, communications from client proxy 210 to client proxy 130 can include a UUID of device 100 and, optionally, a token that is unique within device 200. In an embodiment, among a plurality of devices, the combination of a device UUID and a token that is unique to the device having the UUID defines a unique namespace for the action having the token on the device.

Kernel 140 enforces uniqueness of an RR token in any RR/SR set. Since kernel 140 only permits one RR token per token set, the RR token can be transferred with an Action object to indicate that the Action object is the single viable copy of the Action object 111 as it is passed to a remote process to perform work on behalf of the process that originated Action object 111 (here, process 110). The Action object 111 and Action listener 112 can use any token that enforces uniqueness of one token in the token set. A kernel port RR/SR set is simply a convenient and available choice that is managed by the kernel 140 in a predictable way. Thus, for the Action object token set, the textual meaning of SR (send right) and RR (receive right) is not significant to tracking objects across processes. The significance of the RR/SR token set is that the kernel 140 enforces the rule that only one process can hold the RR token for the Action object at any one time. The Action RR can be transferred between process, but the Action RR cannot be simultaneously held by two or more different processes. The copy of the Action object that holds the RR is the one viable copy of the Action object that is able to send a response back to the originating process that first instantiated the Action object, here process 110.

In addition, use of the kernel RR token as an indicator of the one viable copy of an Action enhances security because a kernel RR token cannot be copied. Thus, the kernel RR token cannot be falsified ("spoofed") by a hacker.

When a first process, e.g. process 110, wants a second process 120 to perform work on behalf of process 110, then process 110 instantiates an Action object 111. Action object 111 can be instantiated with a time out, a handle to a response queue, an IPC endpoint, a remote action handler, and a payload. A payload can be information that Action object may use or act upon in performing the work of the Action object. E.g., a payload can be a Uniform Resource Locator ("URL") to be passed from an application (first process) to a web browser (second process).

Process 110 can instantiate and register Action listener 112 with the kernel 140. In an embodiment, process 110 can instantiate Action listener 112 when process 110 begins encoding Action object 111 for passing in a message to process 120. Action listener 112 can listen for a response from a remote copy of Action object 111, e.g. copy of Action object 121 or 131. Action listener 112 can hold the Action SR token corresponding to the unique Action RR in the RR/SR token set initially requested by Action object 111. Here, the Action RR token is currently held by Action object 111. In an embodiment, there need only be one Action Listener 112 for all Action objects instantiated in a given process.

Process 110 can transmit encoded Action object 111 to process 120, requesting that work be performed by process 120 on behalf of process 110. When process 110 transmits Action object 111 to process 120, kernel 140 can transfer the unique Action RR token from process 110 to process 120 in the encoded message containing Action object 111. The Action SR token is still held Action Listener 121 in process 110.

After the encoded message has been passed from process 110 to process 120, the Action RR token is held by the copy of the Action object 121 in process 120. Action object 111 has transferred away its unique token: Action RR. Thus, Action object 111 is no longer a viable copy of the Action object. The current viable copy of Action object is now copy of Action object 121, because it holds unique token: Action RR.

Process 120 can then pass its copy of Action object 121 to client proxy process 130 to pass the action object to device 200. Kernel 140 again enforces uniqueness of the Action RR token and transfers the Action RR token to client proxy process 130. Copy of Action object 121 has transferred away its unique token: Action RR. Thus, Copy of Action object 121 is no longer a viable copy of Action object 111. The current viable copy of Action object 111 is now copy of Action object 131, because it holds the unique token: Action RR. The Action SR token is still held in process 110 by Action Listener 112.

Using the communication channel described above, client proxy 130 can transmit its copy of Action object 131 to device 200 client proxy process 210 via the communication channel. Since the RR token is relevant only to the kernel 140 of device 100, the client proxy process 130 retains the RR token.

Client proxy 210 on device 200 can receive copy of action object 131 from client proxy 130 on device 100 via the communication channel 7. Client proxy 210 can instantiate an action listener 212 and register the action listener 212 with kernel 240 of device 200. Client proxy 210 can then instantiate an action object 211 from the received copy of the action object 131 from client proxy process 130 of device 100. Client proxy 210 can request a new token pair, e.g. a kernel RR/SR pair, and associate the token pair with the action object 211 on device 200. Client proxy 210 can then request that process 220 perform the work specified in action object 211. Client proxy process 210 can encode the action object 211 and transfer the RR token of the action object 211 and pass the encoded action object 211 to process 220. Process 220 can then decode the action object 211 received from client proxy 210. Process 220 can then instantiate a copy of the action object 221 and a response object 222 for the action within the copy of the action object 221. When process 220 performs the work within copy of action object 221, a response can be generated and encoded by response object 222. The response can be passed by to client proxy 210. Action listener 212 receives the response from process 220. Client proxy 210 can then decode the response, and encode and transmit the response to client proxy 130. In an embodiment, the transmission the device 200 UUID. The transmission from client proxy 210 to client proxy 130 can further include the RR token of the device 100 to indicate to client proxy process 130 that the response is from device 200 and is intended for the device 100 action object 131 having the RR token value in the transmission.

In the event that process 220 fails, kernel 241 can detect the failure of process 220, and send a message to process message queue 242 for retrieval by process 210 action listener 212. Client proxy 210 can then retrieve the failure message from the action listener 212, generate an appropriate response message and pass the response message to client proxy 130 over communication channel 7.

In the event that client proxy 130 fails, or communication between client proxy 130 and proxy 210 fails, or client proxy 210 fails, then process 110 is guaranteed a response indicating the failure. If client proxy process 130 is alive, but loses communication with client proxy 210 on device 200, then client proxy process 130 can generate a response to the action object 111 of process 110 that the device 200, and/or client proxy 210, failed. If client proxy 130 fails, kernel 140 can generate a message of the failure that can be retrieved by action listener 112 of process 110. If client proxy 210 on device 200 fails, then client proxy 130 can generate a response in response object 132 and pass the response to process 110 for retrieval by action listener 112.

Process 110 can receive from client proxy 130, and decode, Response Object 132 having the Action RR token of device 100 for the action object 111. Action Listener 112 is still holding the Action SR token, since the time that Action object 111 was first instantiated and requested the RR/SR token set from kernel 140. Action Listener 112 can compare the Action SR token with the Action RR token in the received response object 132 from process 130. Action Listener 112 can use the received Action RR token to compare with the stored Action SR token for this Action object, to validate that the received response is truly a response to the original Action object 111 initiated by process 110.

Figure 2C:
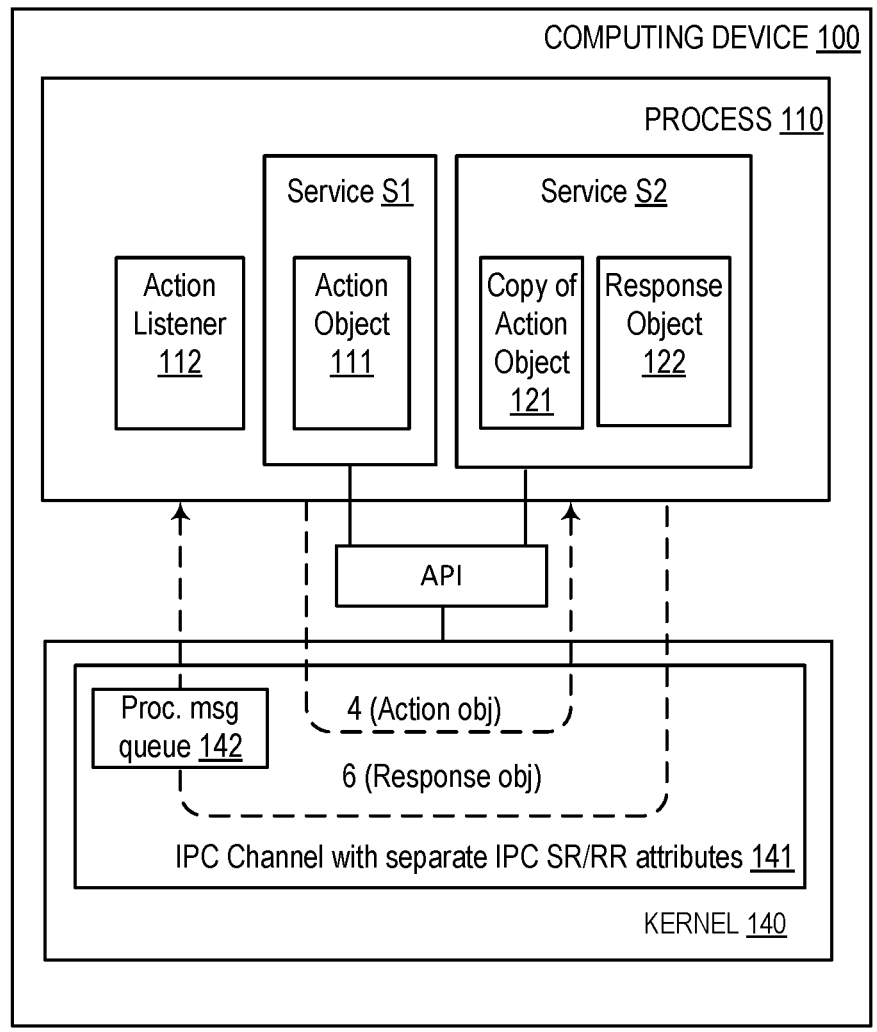
FIG. 2C illustrates, in block form, a system for tracking an object across services within a process that guarantees a response in an efficient manner.

FIG. 2C illustrates, in block form, a system for tracking an object across services within a process that guarantees a response in an efficient manner. A single process can have multiple services, such as service S1 and service S2, within a same process 110. In an embodiment, services S1 and S2 can communication through an application programming interface (API), as described below with reference to FIG. 10. Services S1 and S2 need not have any knowledge of one another. An action object can use a token pair to track the life cycle of the action object across services within a process.

Service S1 can instantiate an action object 111 that represents work that Service S1 can request that Service S2 perform. As described above, process 110 can instantiate listener 112 and request and token pair such as SR/RR from kernel 140 to track the action object 111 across services S1 and S2. Action listener 112 can be registered with the kernel to receive messages associated with token pair SR/RR. Service S1 can pass action object 111 to Service S2 to perform the work within action object 111. In an embodiment, Service S1 can pass the action object 111 to Service S2 via an API. When action object 111 is passed to Service S2, the RR token is also passed to Service S2. Thus, action object 111 is no longer a viable copy of the action object. Service S2 can receive the action object 111, decode the action object 111 and instantiate a copy of action object 121 that will perform the work specified with the action object 111. Service S2 can receive the RR token in the message from Service S1. Once instantiated, copy of action object 121 holds the RR token and becomes the only viable copy of the action object. Service S2 can also instantiate a response object 122 that can pass a response to service S1 in a response message. Service S2 can perform the work within the copy of action object 121 and pass a response to Service S1 in a response message. In an embodiment, Service 2 can pass the response message to Service S1 via an API. If Service S2 fails or times out before performing the work, kernel 140 can send a message of the failure of Service S1. Since Service S1 is a service within process 110, and action listener 112 is registered to process 110 with the kernel 140, action listener 112 can receive the message of failure of Service S2 via process message queue 142. In an embodiment, service S1 can retrieve a response message for the action object from action listener 112. In an embodiment, process 110 can retrieve the response message for the action object from the action listener 112 and pass the message to Service S1 so that Service S1 may act upon the message.

Figure 2D:
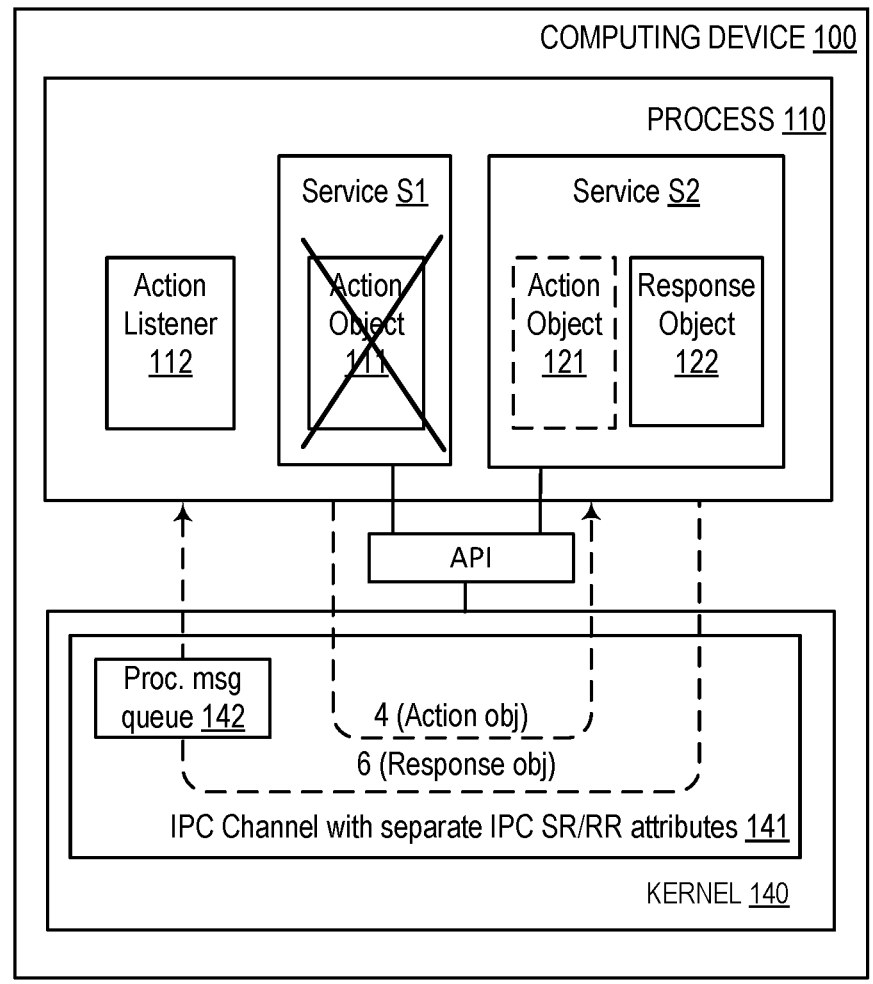
FIG. 2D illustrates, in block form, a system wherein a process having a first service and a second service can ensure that the first service is notified when second service terminates, times out, or fails.

FIG. 2D illustrates, in block form, a system wherein a process having a first Service S1 and a second Service S2 can ensure that the first Service S1 is notified when second Service S2 terminates, times out, or fails. Service S1 can use an action object to implement an assertion model within process 110. E.g. Service S1 can instantiate an action object, request a token pair, such as SR/RR from the kernel, and pass the action object to Service S2. Service S1 can then continue performing a function of Service S1 until Service S2 either terminates, times out, or otherwise indicates to Service S1 that Service S1 can cease performing the function for Service S2.

A single process 110 can have multiple services, such as Service S1 and Service S2, within process 110. In an embodiment, Services S1 and S2 can communication through an application programming interface (API), as described below with reference to FIG. 10. Services S1 and S2 need not have any knowledge of one another. An action object can use a token pair, e.g. SR/RR, to track the life cycle of the action object across services within a process.

In an example, Service S1 can implement a function that silences or suppresses certain notifications to a user, such as notifications of emails, texts, or phone calls. Service S2 may want such a service during a time, such as a meeting or during a workout, for only so long as Service S2 is active. At the termination, time out, or failure of Service S2, Service S1 can stop performing the service S1 in response to receiving a notification that Service S2 has terminated, timed out, or failed.

Service S1 can instantiate an action object 111, request a token pair SR/RR from the kernel 140, encode the action object 111, and pass the action object 111 and RR token in a message to Service S2 within process 110. Process 110 can instantiate action listener 112 can be registered with the kernel to receive messages associated with token pair SR/RR. Service S1 can pass action object 111 to Service S2. In an embodiment, Service S1 can pass the action object 111 to Service S2 via an API. When action object 111 is passed to Service S2, the RR token is also passed to Service S2. In this embodiment, there is no work associated with the action object, other than for Service S2 to pass a response to Service S1 when Service S2 terminates, times out or fails. The response message conveys to Service S1 that Service S1 can stop performing the specified function for Service S2. Thus, upon passing of the action object to Service S2, Service S1 can destroy the action object 111. When Service S2 receives the action object 111, and decodes the action object 111, Service S2 can receive the RR token in the message from Service S1 and instantiate a copy of action object 121. Once instantiated, copy of action object 121 holds the RR token and becomes the only viable copy of the action object. Service S2 can also instantiate a response object 122 that can pass a response to service S1 in a response message. When Service S2 no longer needs Service S1 to perform the specified function, Service S2 can pass a response to the action object to Service S1 in a response message. In an embodiment, Service 2 can pass the response message to Service S1 via an API. If Service S2 fails or times out before performing the work, kernel 140 can send a message of the failure of Service S1. Since Service S1 is a service within process 110, and action listener 112 is registered to process 110 with the kernel 140, action listener 112 can receive the message of failure of Service S2 via process message queue 142. In an embodiment, service S1 can retrieve a response message for the action object from action listener 112. In an embodiment, process 110 can retrieve the response message for the action object from the action listener 112 and pass the message to Service S1 so that Service S1 may act upon the message. In this embodiment, acting upon the message can include stopping the performance of the specified function of Service S1 on behalf of Service S2.

Figure 3A:
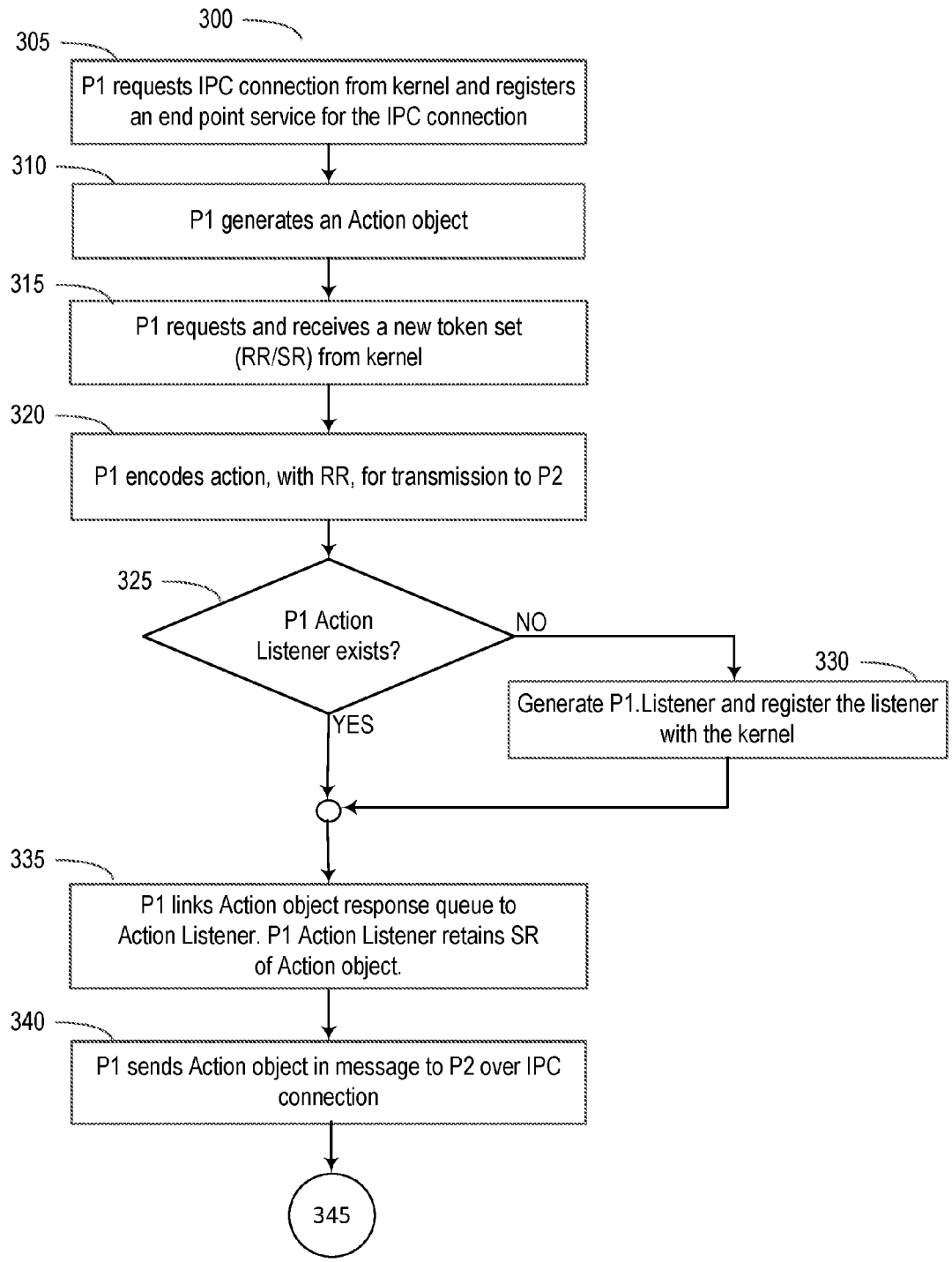
FIGS. 3A and 3B illustrate a method of securely tracking a processing object across two processes.
Figure 3B:
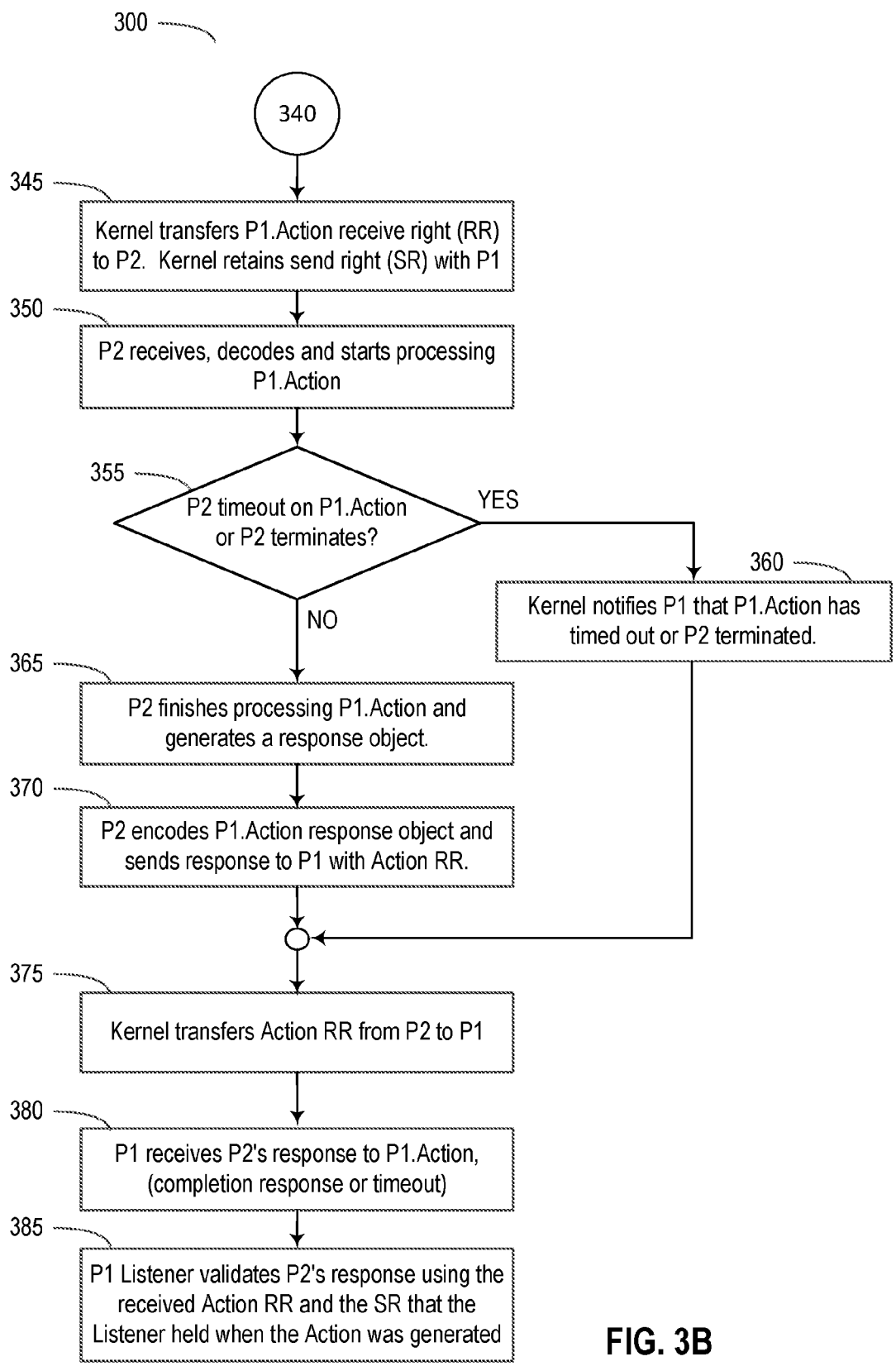

FIGS. 3A and 3B illustrate a method 300 of securely tracking a processing object across two processes, wherein a response is guaranteed to be returned via the kernel to the first process, by the second process. The guaranteed response can be a response from an Action object from a remote process, or a time out from a process, or a notification from kernel 140 that the first or second process has terminated.

A first process can be performed, e.g., in response to computing device 100 receiving a push notification such as "new email received," "new text received," or "incoming call." The first process can be performed in response to a user input, a system interrupt, a timer expiring, an event, or any other trigger that can cause a first process 110 to call a second process 120 to perform work on behalf of the first process 110.

In operation 305, first process 110 ("P1") can request an inter-process communication ("IPC") channel 141 from system kernel 140. Process P1 can call kernel 140 to register an end point service that can receive and send messages over IPC channel 141. Generally, process P1 can send and receive messages over IPC channel 141 for a plurality of threads executing within P1. Thus, operation 305 may have already been performed by process P1 prior to beginning method 300. Accordingly, operation 305 need not be redundantly performed for each instance of P1 calling a second process 120 ("P2").

In operation 310, process P1 can generate a new Action object 111 to perform work. Action object 111 can comprise a payload, a timeout value, a handle to a response queue, and an action handler. The payload can be any information that may be needed to execute the action for which Action object 111 was generated. For example, payload can be a Uniform Resource Locator ("URL") for use by process P2 to respond to a notification received by P1, such as an email with an embedded link, requesting that a user accept a friendship request on Facebook®. A payload can further include, e.g., a message identifier that identifies a message to be retrieved using a text message application. A timeout value can represent a time at which first process P1 should stop waiting on a response from second process P2. A response queue can be any message queue format configured to receive messages over IPC connection 141, such that Action object action handler can process the received response.

In operation 315, process P1 can request a new token set from kernel 140. The token set can include a first token that can only be held by one process at a time, and a second token. The first token can be used to track Action object 111 across first process P1 and second process P2. In an embodiment, the token set can include a receive right ("RR") and a send right ("SR"). In an embodiment, the receive right RR token can be the first token that can only be held by one process at a time. Kernel 140 can enforce the rule that only one process at a time can hold the first token. Other token sets can be used in lieu of the RR/SR token set. Because the RR/SR set is being used to track an object, not to send and receive messages, the literal textual meaning of "send right" and "receive right" is not relevant to the tracking of Action object 111 across processes. IPC connection 141 can have its own receive right RR and send right(s) SR that are managed separately by kernel 140 in accordance with known IPC protocols.

In operation 320, first process P1 can encode Action object 111, payload, and the first token (e.g., "RR") for transmission to second process P2 over IPC connection 141.

In operation 325, it can be determined whether process P1 has already generated an Action Listener 112 to listen for responses to one or more Action objects generated within process P1. In an embodiment, there can be a single Action Listener in a process for all Action objects generated with the process. In another embodiment, there can be an Action Listener for each Action object generated in a process. In still another embodiment, certain types of Action objects can share a single Action Listener, while other types of Action objects can cause an Action Listener to be generated for each Action object having a particular type. For example, Action objects can have a priority attribute that can be used to determine whether an Action object shares an Action Listener with other Action objects, wherein a high priority Action object has its own Action Listener and a low priority Action object shares an Action Listener.

If, in operation 325, it was determined that first process P1 does not yet have an Action Listener generated that this Action object can use, then in operation 330 first process P1 generates an Action Listener. In an embodiment, process P1 registers the Action Listener with kernel 140 to receive notifications associated with the token set assigned to Action object by kernel 140. If, in operation 325, it was determined that first process P1 already has an Action Listener, then method 300 resumes at operation 335.

In operation 335, first process P1 can link the response queue of Action object 111 into Action Listener 112. Action Listener 112 can retain the second token, e.g. "SR." in association with response queue of Action object 111.

In operation 340, first process P1 can send Action object 111 to second process P2 in a message over IPC connection 141. Method 300 continues at operation 345, described with reference to FIG. 3B.

In FIG. 3B, operation 345, kernel 140 can transfer Action object 111 first token "RR" from first process P1 to second process P2. Action object 111 second token "SR" can still be held by Action Listener 112 in first process P1.

In operation 350, second process P2 can decode the message from first process P1 that contains Action object 111. Second process P2 can determine that P2 is able to process the work described in the Action object and second process P2 then can perform the work on behalf of first process P1. Second process P2 can then generate a copy of Action object 121 from the message received from first process P1. In an example, second process P2 may be a text message application. The payload in the message from first process P1 may, e.g., identify a text message that second process P2 is to retrieve and return to first process P1.

In operation 355, it is determined whether second process P2 has timed out while processing the copy of the Action object 121. If so, then in operation 360, kernel 140 can notify process P1 that the copy of Action object 121 in second process P2 has timed out in second process P2. Similarly, if second process P2 terminates before the copy of Action object 121 produces a response and response message for first process P1, then kernel 140 can notify first process P1 that second process P2 has terminated.

If, in operation 355, second process P2 did not time out or terminate while processing the copy of Action object 121, then in operation 365, second process P2 can finish processing the copy of Action object 121. As a part of finishing processing of the copy of Action object 121, second process P2 can generate a response object for packaging and sending back to first process P1 via the kernel.

In operation 370, second process P2 can encode the response object generated in operation 365, along with the Action object first token ("RR"), and send the encoded response and first token RR back to first process P1.

In operation 375, kernel 140 can transfer the Action object first token, RR, from second process P2 back to first process P1. Kernel 140 can transfer the Action object first token, RR, from second process P2 to first process P1 regardless of whether second process P2 finished processing the copy of Action object 121 or whether second process P2 timed out or died during processing of the copy of Action object 121. Thus, first process P1 is guaranteed so receive some type of response under any circumstance.

In operation 380, first process P1 receives the response, either from kernel 140 notifying first process P1 of the termination or timeout of second process P2, or a completed response to the copy of the Action object 121.

In operation 385, Action Listener 112 in first process P1 can validate the received response to Action object 111 by comparing the second token, SR, retained in Action Listener 112, to the first token, RR, returned from second process P2 to first process P1 by kernel 140. If the RR/SR set is validated by Action Listener 112, then the received response is a valid response to Action object 111's request that work be performed by second process P2 on behalf of first process P1.

Figure 4A:
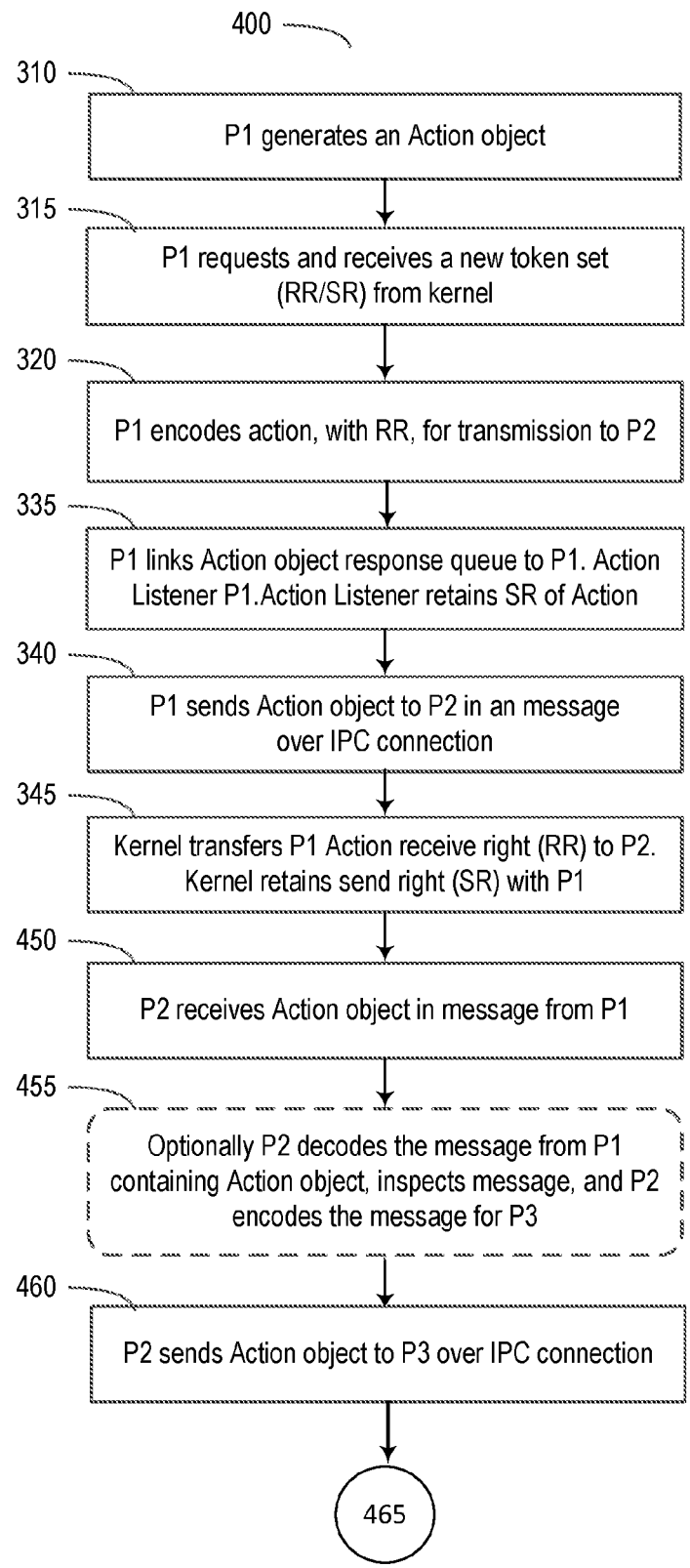
FIGS. 4A and 4B illustrate a method of securely tracking a processing object across three processes, according to some embodiments.
Figure 4B:
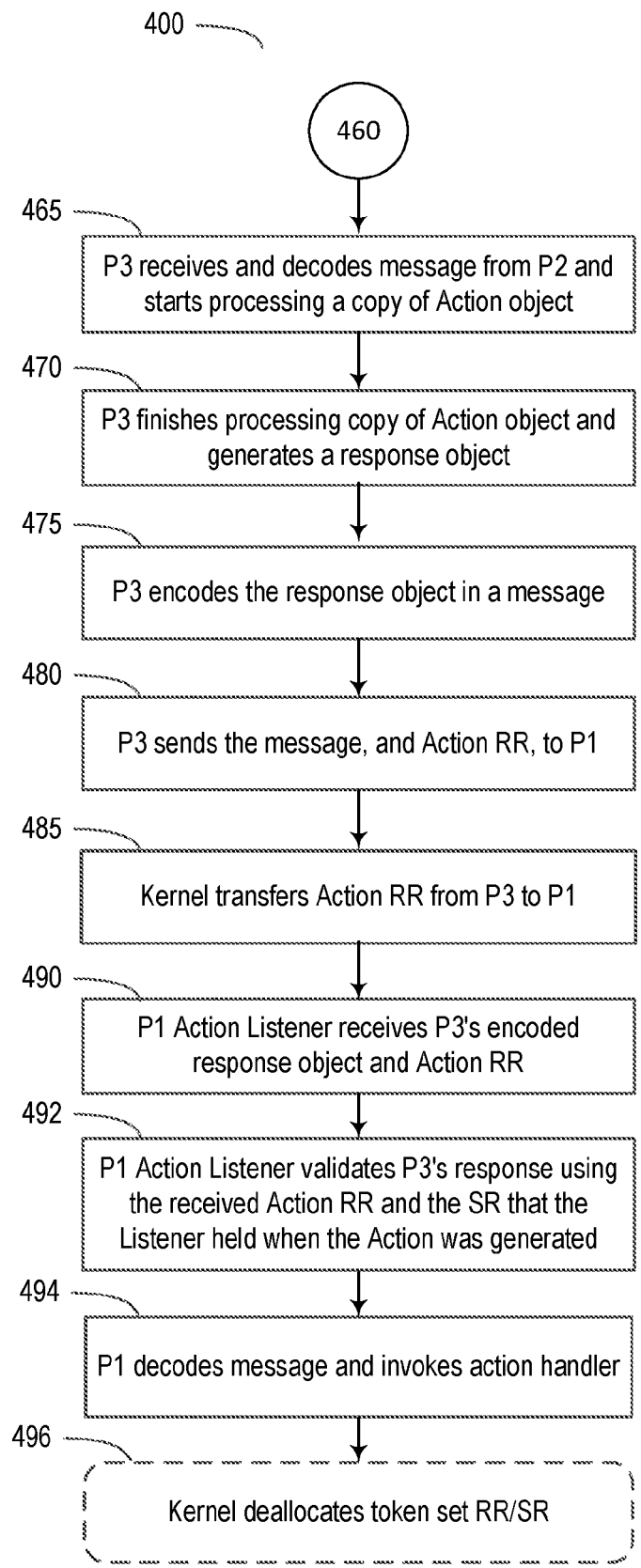

FIGS. 4A and 4B illustrate a method of securely tracking a processing action across three processes, according to some embodiments. Some details have been omitted from FIGS. 4A and 4B that were described above with reference to FIGS. 3A and 3B. For example, FIGS. 4A and 4B presume that an IPC connection 141 has already been opened and an end point service routine has been registered with kernel 140. FIGS. 4A and 4B further assume that an Action Listener 112 has already been generated in first process P1 and that it is understood that an Action object 111 generated in first process P1 can include a response queue that can be linked to Action Listener 112. In addition, in FIGS. 4A and 4B, it is assumed that no process times out or terminates and that the first process P1 receives a completed response.

Some of the operations in FIGS. 4A and 4B were previously described with reference to FIG. 3, above, and are repeated here.

Although FIGS. 4A and 4B illustrate sending an Action object across three processes, it is to be understood that an Action object can be transmitted to a remote process across a sequence of any number of processes and can still guarantee a response back from the remote process to the first process P1, via the kernel, without passing the response back through any of the intervening processes. It is to be further understood that the sequence of any number of processes can span across multiple devices as well as across process space on a single device. For example, a first process P1 on a first device could initiate the method operations of either methods 300 or 400, passing an Action object to a remote process $P_N$ on a second (or third, or $K^{th}$) device, and the remote process $P_N$ would still guarantee a response back to the first process P1 on the first device.

In operation 310, of method 400, process P1 can generate a new Action object 111 to perform work. Action object 111 can comprise a payload, a timeout value, a handle to a response queue, and an action handler. The payload can be any information that may be needed to execute the action for which Action object 111 was generated. The payload can be another Action object 111' (not shown). For example, payload can be a Uniform Resource Locator ("URL") for use by process P2 to response to a notification received by P1, such as an email with an embedded link, requesting that a user accept a friendship request on Facebook®. A payload can further include, e.g., a message identifier that identifies a message to be retrieved using a text message application. A timeout value can represent a time at which first process P1 should stop waiting on a response from second process P2. A response queue can be any message queue format configured to receive messages over IPC connection 141, such that Action object action handler can process the received response.

In operation 315 of method 400, process P1 can request a new token set from kernel 140. The token set can include a first token that can only be held by one process at a time, and a second token. The first token can be used to track Action object 111 across first process P1, second process P2, and third process P3, or a sequence of any number of processes to a remote process $P_N$. In an embodiment, the token set can include a receive right ("RR") and a send right ("SR"). In an embodiment, the receive right RR can be the first token that can only be held by one process at a time. Kernel 140 can enforce the rule that only one process at a time can hold the first token having the receive right. Other token sets can be used in lieu of the RR/SR token set. Because the RR/SR token set is being used to track an object, not to facilitate the sending and receiving of messages, the literal textual meaning of "send right" and "receive right" is not relevant to the tracking of Action object 111 across processes. IPC connection 141 can have its own receive right RR and send right(s) SR that are managed separately by kernel 140 to facilitate inter-process communication ("IPC") in accordance with known IPC protocols.

In operation 320 of method 400, first process P1 can encode Action object 111, and the first token (e.g., "RR") for transmission to second process P2 over IPC connection 141.

In operation 335 of method 400, first process P1 can link a response queue of Action object 111 into Action Listener 112. Action Listener 112 can retain the second token, e.g. "SR." in association with response queue of Action object 111.

In operation 340 of method 400, first process P1 can send Action object 111 to second process P2 over IPC connection 141.

In operation 345 of method 400, kernel 140 can transfer Action object 111 first token "RR" from first process P1 to second process P2. Action object 111 second token "SR" is still held by Action Listener 112 in first process P1.

In operation 450, second process P2 can receive Action object 111 in an encoded message from first process P1, along with the Action first token, RR.

In operation 455, second process P2 can optionally decode the encoded message from first process P1 and examine the contents of the message to determine whether second process P2 can do the work in the Action object 111 encoded in the message. Second process P2 can generate a copy of Action object 121 to determine whether second process P2 can do the work in the copy of the Action object 121. Upon determining that the received message is for third process P3, then second process P2 can encode the copy of the Action object 121, along with the first token, RR.

In operation 460, second process P2 can send the encoded copy of the Action object 121, along with the first token, RR, to third process P3. Method 400 continues at operation 465 as shown on FIG. 4B.

In operation 465, third process P3 can receive and decode the message from second process P2, can generate a copy of Action object 131, and can start performing the work to be done by the copy of Action object 131, using the Action handler that is a part of the copy of the Action object 131.

In operation 470, third process P3 finishes process the work to be done by the copy of the Action object 131. Third process P3 can generate a response object for sending back to the first process, P1, via the kernel, without passing the response object through second process P2.

In operation 475, third process P3 can encode the response object in a message, along with the first token, RR.

In operation 480, third process P3 can send the encoded message holding the response object and first token of the Action object, RR, back to first process P1, via the kernel, without passing the response object back through intervening second process P2.

In operation 485, kernel 140 can transfer the rights in first token RR from third process P3 to first process P1. The copy of Action object 131 in third process P3 no longer has the first token, RR. Therefore copy of Action object 131 cannot send another response to any process. Third process P3 can terminate the copy of the Action object 131.

In operation 490, in the first process P1, Action Listener 112 can receive the encoded message from third process P3, via the kernel 140, along with the first token, RR, without passing the encoded message through intervening second process P2. The encoded message is received at the Action Handler 112 response queue associated with Action object 111. Action Listener 112 still holds the second token SR of the RR/SR token set that the Action Listener held 112 when Action object 111 was first generated.

In operation 492, Action Listener 112 can compare the first token, RR, and the second token, SR, to determine whether the response received from third process P3 is a valid response to the Action object 111 of first process P1.

In operation 494, first process P1 can decoded the message and process the response object inside the message.

In operation 496, first process P1 can optionally request that kernel 140 deallocate token set RR/SR as it is no longer needed.

Figure 5:
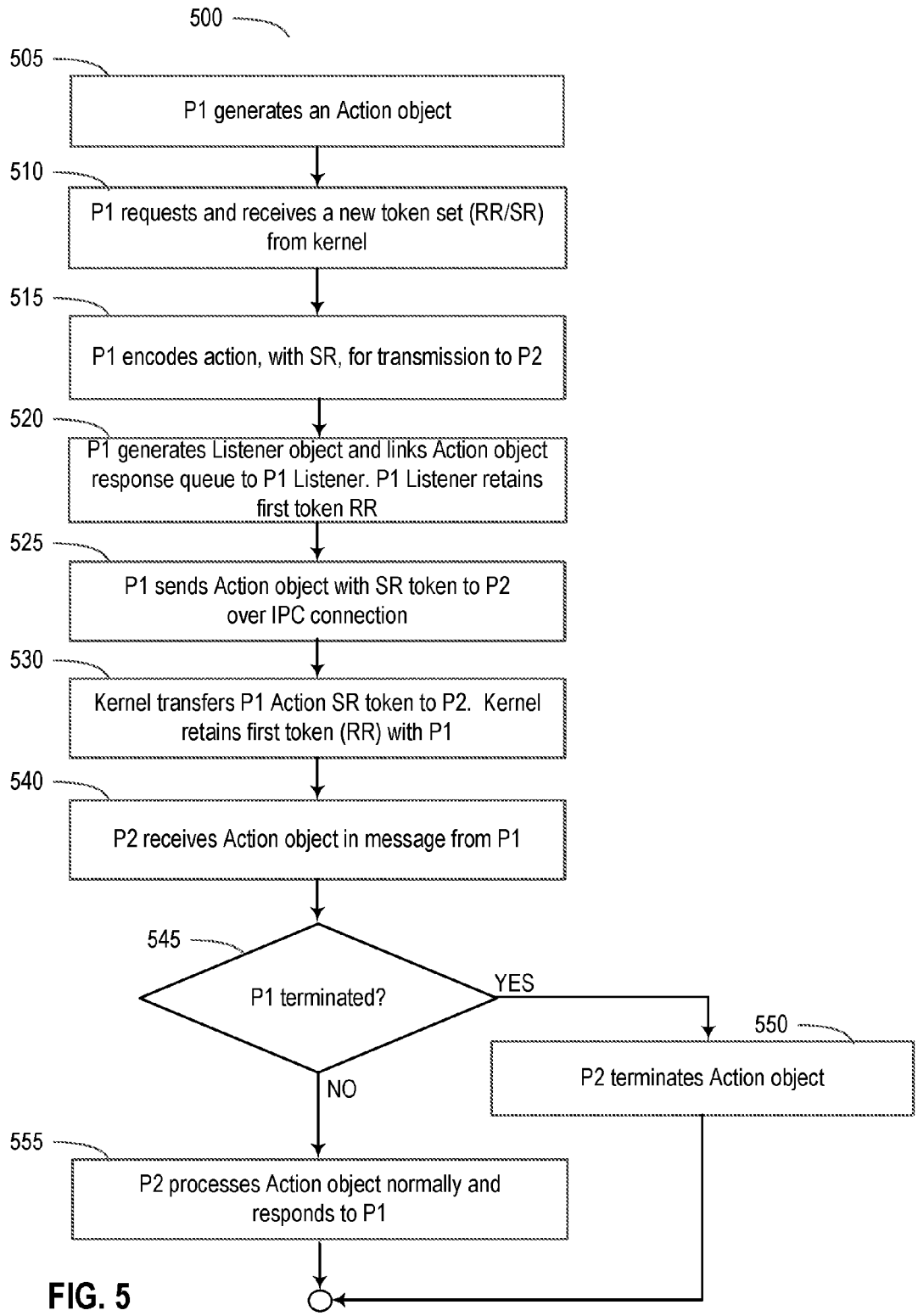
FIG. 5 illustrates a method of detecting the lifecycle of a calling process that requests work by a called process, according to some embodiments.

FIG. 5 illustrates a method 500 of detecting the lifecycle of a first process P1 that requests a second process P2 to do work on behalf of the first process P1. If the process P1 terminates, or if the process P1 cancels Action 111, then the process P2 can terminate its processing of work on behalf of the terminated process P1 because P1 is not running and cannot receive the response of the process P2. In the case of process P1 canceling the Action 111, process P1 can unlink the canceled Action 111 from Action Listener 112 since process P1 is no longer waiting on a response to the Action 111 from Copy of Action object 121. Thus, there is no reason for the second process P2 to waste processing resources on behalf of terminated process P1.

A kernel 140 of an operating system can keep track of the execution status of each process in a computing system 100. A process can request that the kernel provide a set of tokens associated with the process. The first token of the set can be a kernel "receive right" ("RR") token. The kernel 140 can enforce the rule that there can only be one RR token in the set of tokens. A second token in the token set can be a "send right" ("SR") token. The kernel 140 can monitor the RR token to determine whether the process holding the RR token is running ("alive") or terminated ("dead"). A process holding the SR token can register with the kernel 140 to receive a notification that the process holding the RR has terminated. In method 500, the RR token is held by first process P1 that generates an Action object that holds an SR token. When process P1 calls process P2 and passes Action object 111 to P2, the kernel 140 can transfer the SR token to process P2. Process P2 can register with kernel 140 to receive a notification if P1 terminates. If P1 terminates, P2 can terminate processing work on behalf of the now-terminated P1.

In operation 505, process P1 generates a new Action object 111 to perform work. Action object 111 can comprise a payload, a timeout value, a handle to a response queue, and an action handler. The payload can be any information that may be needed to execute the action for which Action object 111 was generated. The payload can also be another Action object for another process to generate and process. A payload can be, for example, a Uniform Resource Locator ("URL") for use by process P2 to respond to a notification received by P1, such as a notification of an email being received. The email can have an embedded link, requesting that a user accept a friendship request on Facebook®. A payload can further include, e.g., a message identifier that identifies a message to be retrieved using a text message application. A timeout value can represent a time at which first process P1 should stop waiting on a response from second process P2. A response queue can be any message queue format configured to receive messages over IPC connection 141, such that an action handler of Action object can process the received response.

In operation 510, process P1 can request a new token set from kernel 140. In an embodiment, the token set can include a receive right ("RR") token and a send right ("SR") token. A first token in the set can be the RR token. The second token can be the SR token. The RR token can only be held by one process at a time. A process holding the second token can register with the kernel to receive a notification if the process holding the first token terminates. Kernel 140 can enforce the rule that only one process at a time can hold the first token. Other token sets can be used in lieu of the RR/SR set. Because the RR/SR set is being used to track the lifecycle of a process, not to send and receive messages, the literal textual meaning of "send right" and "receive right" is not relevant to tracking the lifecycle of a process. IPC connection 141 can have its own receive right RR and send right(s) SR that are managed separately by kernel 140 in accordance with known IPC protocols.

In operation 515, first process P1 can encode Action object 111, and the second token (e.g., "SR") for transmission to second process P2 over IPC connection 141.

In operation 520, first process P1 can generate an Action Listener 112 and can link the response queue of Action object 111 into Action Listener 112. Action Listener 112 can retain the first token, e.g. "RR."

In operation 525, first process P1 can encode and send Action object 111 to second process P2 over, e.g., IPC connection 141.

In operation 530, kernel 140 can transfer process P1 token "SR" to second process P2. First token "RR" is held by Action Listener 112 in the first process P1.

In operation 535, second process P2 can receive and decode the message from first process P1 that contains Action object 111. P2 can generate a copy of Action object 121 from the decoded message. Second process P2 can determine that it is able to process the work described in the Action object 111 and second process P2 then can perform the work on behalf of first process P1. Second process P2 can then generate a copy of Action object 121 from the message received from first process P1. In an example, second process P2 may be a text message application. The payload in the message from first process P1 may, e.g., identify a text message that second process P2 is to retrieve and return to first process P1.

In operation 545, it can be determined whether token RR indicates that process P1 has terminated. The determination can be made by kernel 140 detecting that the process P1, associated with token RR, has terminated, and that therefore token RR has become invalid. Kernel 140 can notify process P2 that process P1 has terminated.

If, in operation 545, it is determined that process P1 has terminated, then in operation 550 process P2 can terminate processing of copy of Action object 121 because process P1 has terminated and is not available to receive a response generated by Action object 121.

If, in operation 545, it is determined that process P1 is running, then in operation 555 process P2 can process copy of Action object 121, generate a response object, encode the response object in a message, and transmit the response message to process P1.

Figure 6:
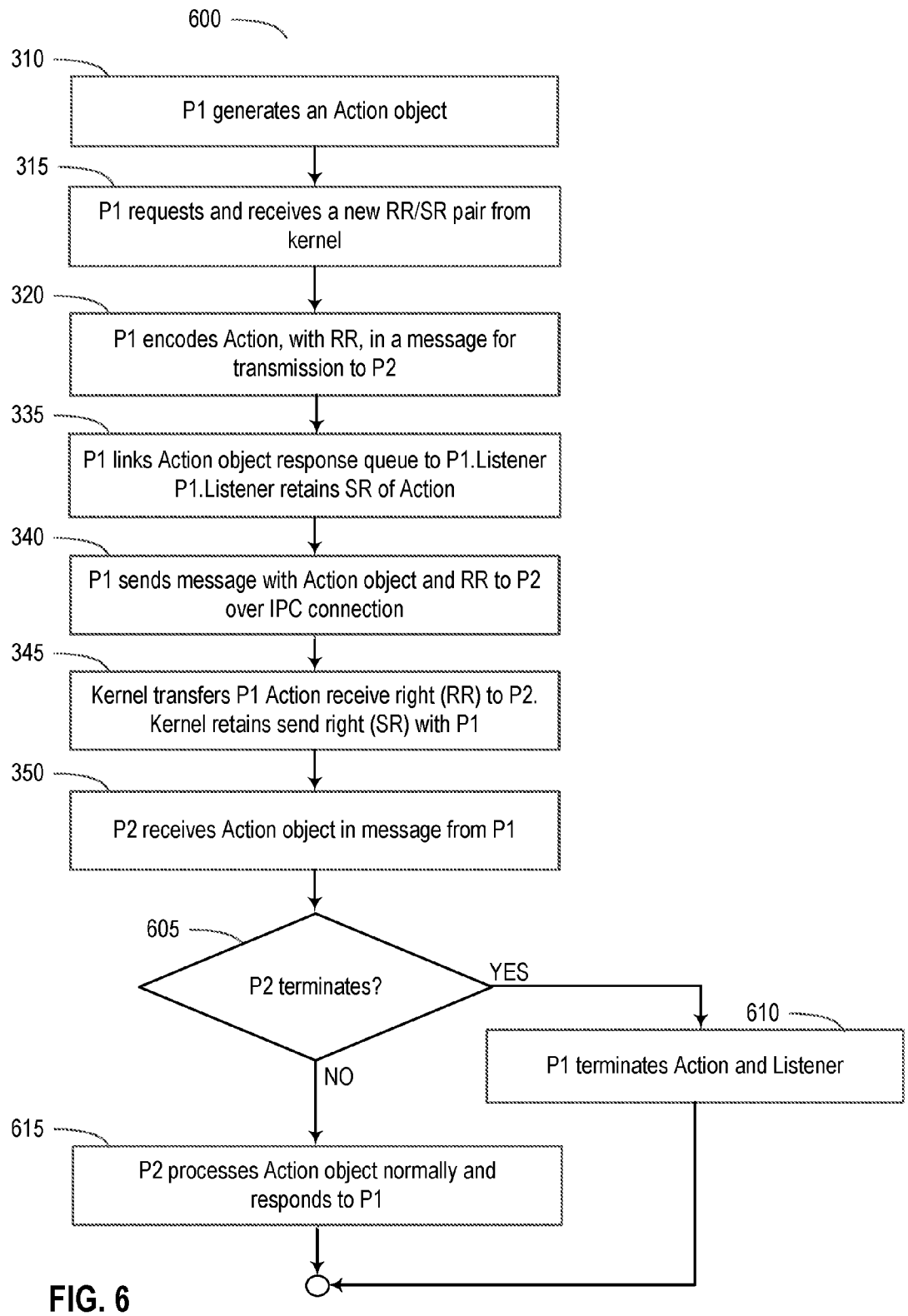
FIG. 6 illustrates a method of detecting the lifecycle of a processing object passed to a called process to perform work on behalf of a calling process, according to some embodiments.

FIG. 6 illustrates a method 600 of detecting the lifecycle of a second process P2 that was requested by a first process P1 to do work on behalf of the first process P1. If the process P2 terminates, then the process P1 can stop waiting for a result from process P2 because a response is not forthcoming from terminated process P2.

A kernel 140 of an operating system can keep track of the execution status of each process in a computing system 100. A process can request that the kernel 140 provide a set of tokens associated with the process. The first token of the set can be a kernel "receive right" ("RR") token. The kernel 140 enforces the rule that there can only be one RR token in the set of tokens. A second token in the token set can be a "send right" ("SR") token. The kernel 140 can monitor the RR token to determine whether the process holding the RR token is running ("alive") or terminated ("dead"). A process holding the SR token can register with the kernel 140 to receive a notification that the process holding the RR has stopped running.

In method 600, the RR token can be transferred to the second process P2 when Action object 111 is passed to second process P2. An Action Listener 112 can listen for a response from copy of Action object 121 in process P2. Action Listener 112 in process P1 can hold the SR token. Process P1 can register with kernel 140 to receive a notification if RR indicates that P2 has terminated. If P2 terminates, then process copy of Action object 121 will never return a response to P1. Thus, P1 can terminate the Action object 111 and terminate the Listener for Action object 111 because no response is forthcoming from copy of Action object 121 in process P2.

In method 600, the holding and transfer of tokens cam be the same as in method 300. Specifically, the SR token can stay with the Action Listener in process P1 and the RR token can be transferred with the Action object across processes and the transfer can be maintained by the kernel. In method 600, process P1 can additionally register with the kernel 140 to receive a notification if the process holding the RR token terminates. Thus, in one embodiment, method 600 can utilize the same RR/SR set of tokens as is used in method 300 to track the lifecycle of the Action object 111 across processes. Alternatively, in method 600 a new RR/SR set of tokens can be requested from kernel 140 for tracking the lifecycle of processes while a different set of RR/SR set of tokens can be used for tracking the lifecycle of Action object 111 across processes.

In the following description of method 600, some of the operations were previously described with reference to FIG. 3, and are repeated here.

In operation 310 of method 600, process P1 can generate a new Action object 111 to perform work. Action object 111 can comprise a payload, a timeout value, a handle to a response queue, and an action handler. The payload can be any information that may be needed to execute the action for which Action object 111 was generated. In an embodiment, the payload can include another Action object. A payload can be, for example, a Uniform Resource Locator ("URL") for use by process P2 to respond to a notification received by process P1, such as a notification of an email being received. The email can have an embedded link, requesting that a user accept a friendship request on Facebook®. A payload can further include, e.g., a message identifier that identifies a message to be retrieved using a text message application. A timeout value can represent a time at which first process P1 should stop waiting on a response from second process P2. A response queue can be any message queue format configured to receive messages over IPC connection 141, such that Action object action handler can process the received response.

In operation 315 of method 600, process P1 can request a new token set from kernel 140. In an embodiment, the token set can include a receive right ("RR") token and a send right ("SR") token. A first token in the set can be the RR token. The second token can be the SR token. The RR token can only be held by one process at a time. A process holding the second token SR can register with the kernel to receive a notification if the process holding the first token RR terminates. Kernel 140 can enforce the rule that only one process at a time can hold the first token RR. Other token sets can be used in lieu of the RR/SR set of tokens. Because the RR/SR set is being used to track the lifecycle of processes, the literal textual meaning of "send right" and "receive right" is not relevant to the tracking the lifecycle of a process in method 600. IPC connection 141 can have its own receive right RR and send right(s) SR that are managed separately by kernel 140 in accordance with known IPC protocols.

In operation 320 of method 600, first process P1 can encode Action object 111, and the first token (e.g., "RR") for transmission to second process P2 over IPC connection 141.

In operation 335 of method 600, first process P1 can generate an Action Listener 112 and can link the response queue of Action object 111 into Action Listener 112. Action Listener 112 can retain the second token, e.g. "SR."

In operation 340 of method 600, first process P1 send Action object 111 to second process P2. In an embodiment, P1 can send Action object to second process P2 over IPC connection 141.

In operation 345 of method 600, kernel 140 can transfer P1 Action "RR" to second process P2. Second token "SR" can be held by Action Listener 112 in first process P1.

In operation 350 of method 600, second process P2 can receive and decode the message from first process P1 that contains Action object 111. Second process P2 can determine that it is able to process the work described in the Action object and second process P2 then can perform the work on behalf of first process P1. Second process P2 can then generate a copy of Action object 121 from the message received from first process P1. In an example, second process P2 may be a text message application. The payload in the message from first process P1 may, e.g., identify a text message that second process P2 is to retrieve and return to first process P1.

In operation 605, it can be determined whether token RR indicates that process P2 has terminated. The determination can be made by kernel 140 detecting the process P2 has terminated, and that therefore token RR has become invalid. Kernel 140 can notify process P1 that the RR token has become invalid and that, therefore, process P2 has terminated.

If, in operation 605, it is determined that process P2 has terminated, then in operation 610 process P1 can terminate the original Action object 111 in process P1 and can delete the Action Listener 112 for Action object 111 because no response will be forthcoming from copy of Action object 121 in process P2, because P2 has terminated.

If, in operation 605, it is determined that process P2 is running, then in operation 615 process P2 can process copy of Action object 121, generate a response object, encode the response object in a message, and return the response message to process P1.

Figure 7:
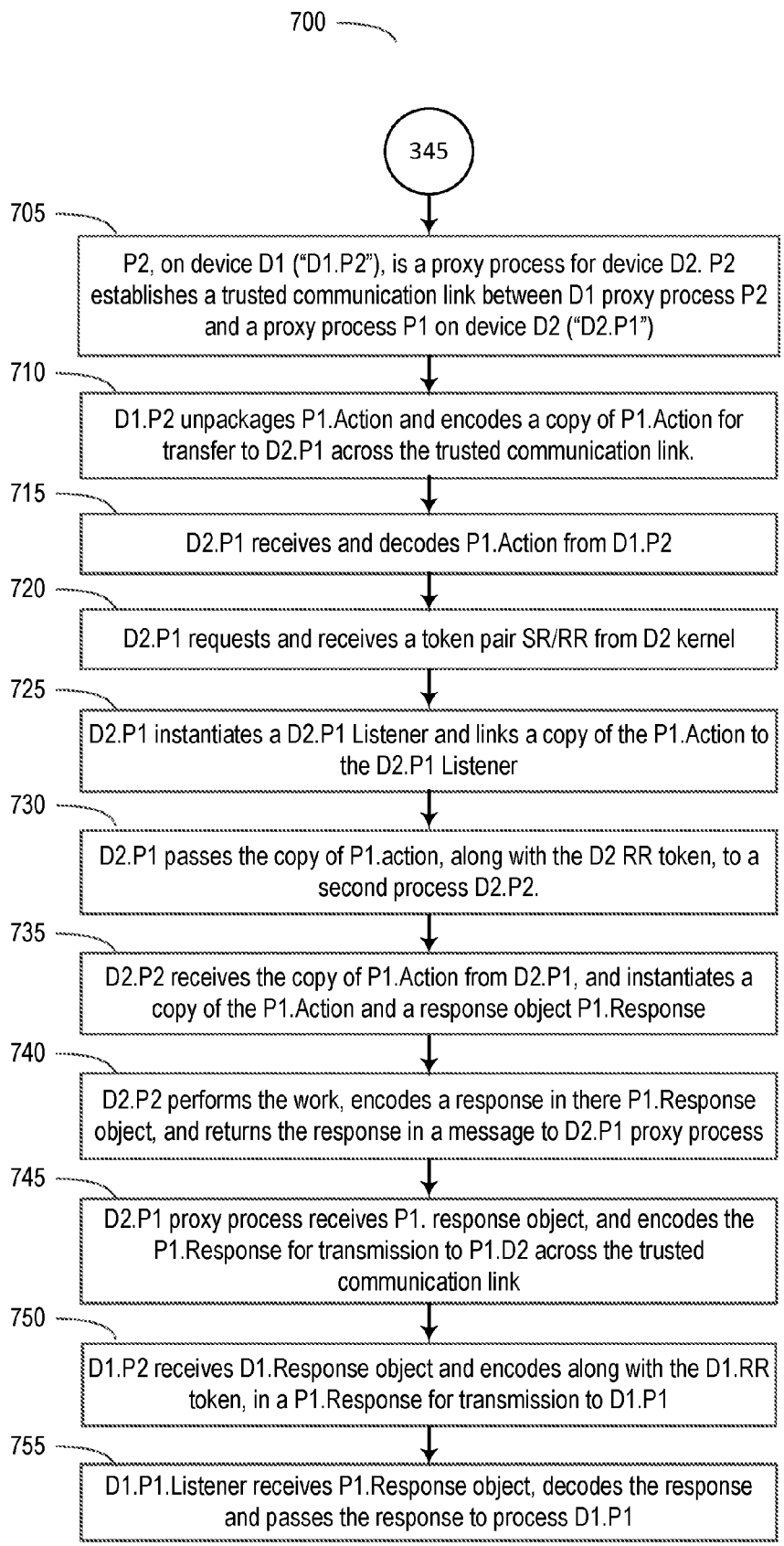
FIG. 7 illustrates, a method 700 for tracking an object across processes and devices in a secure and efficient manner.

FIG. 7 illustrates, in block form, a method 700 for tracking an action object 111 across processes and devices in a secure and efficient manner. A user may have two devices D1 and D2 that can communicate, such as a smart phone ("D1") and a smart watch ("D2"). A user may see, on the smart watch, a notification that an email, text, or phone call has been received by the smart phone. A user may also want to respond to the notification using the smart watch. An action object can guarantee that the smart phone will receive a response, including a time out, by transmitting the action object across a trusted communication channel between the smart phone and smart watch as described below.

The operations for method 700 begin with operations 305 through 345 of FIGS. 3A and 3B, described above. These operations instantiate and action object, instantiate a listener for the object, obtain the token pair RR/SR from the kernel of D1, encode the action object and send the action object to a second process P2 on device D1. The nomenclature "D1.P2" denotes "process P2" of "device D1." In the interest of brevity, the description of operations 305 is not repeated here. Method 700 begins at operation 705, after operations 305 through 345 of FIGS. 3A and 3B have been performed.

In operation 705, a second process P2 on first device D1 ("D1.P2") can be a proxy for a second device D2. D1.P2 can establish a trusted communication channel between first device D1 and second device D2. In an embodiment, the trusted communication channel can be encrypted. Proxy process D1.P2 can communicate with a corresponding proxy process D2.P1 on the second device via the trusted communication channel. The trusted communication channel can include a time-out, a watchdog, or other keep-alive signal such that D1.P2 can detect loss of communication with D2.P1, and likewise, D2.P1 can detect loss of communication with D1.P2.

In operation 710, D1.P2 can unpackage the D1.P1.Action object received from the first process P1 on device D1 ("D1.P1"). D1.P2 can generate a copy of the D1.P1.Action for transfer to D2.P1 across the trusted communication channel.

In operation 715, D2.P1 can receive and decode the D1.P1.Action received from D1.P2 over the trusted communication channel.

In operation 720, D2.P1 can request and receive a token pair SR/RR from the device D2 kernel.

In operation 725, D2.P1 can instantiate a D2.P1.Listener and link a copy of the D1.P1.Action to the D2.P1.Listener.

In operation 730, D2.P1 can encode D1.P1.Action, and the D2.RR token, in a message to be sent to a second process on device 2, "D2.P2" that will perform the work in the D1.P1.Action object.

In operation 735, D2.P2 can receive the copy of the D1.P1.Action and D2.RR token from D2.P1, and instantiate a copy of the D1.P1. Action and a corresponding response object.

In operation 740, D2.P2 can perform the work in the copy of the D1.P1.Action object, and generate a response message. For example, D1.P1.Action may contain an action to display the name of an incoming caller. D2.P2 can generate, e.g., a response generated by the smart watch that the user wants P1 to block a call with a call-blocking message.

In operation 745, D2.P1 proxy process can receive the response message from D2.P2, including the D2.RR token, encode the P2.D2response message, and transmit the message to corresponding device proxy process, D1.P2 on device D1.

In operation 750, D1.P2 can receive the D1.Response object, unpackage the D1.Response object, encode a D1.Response object and transmit the D1.Response object to D1.P1.

In operation 755, D1.P1.Listener can receive the D1.Response object from D1.P2, decode the response, and pass the response to D1.P1.

Figure 8:
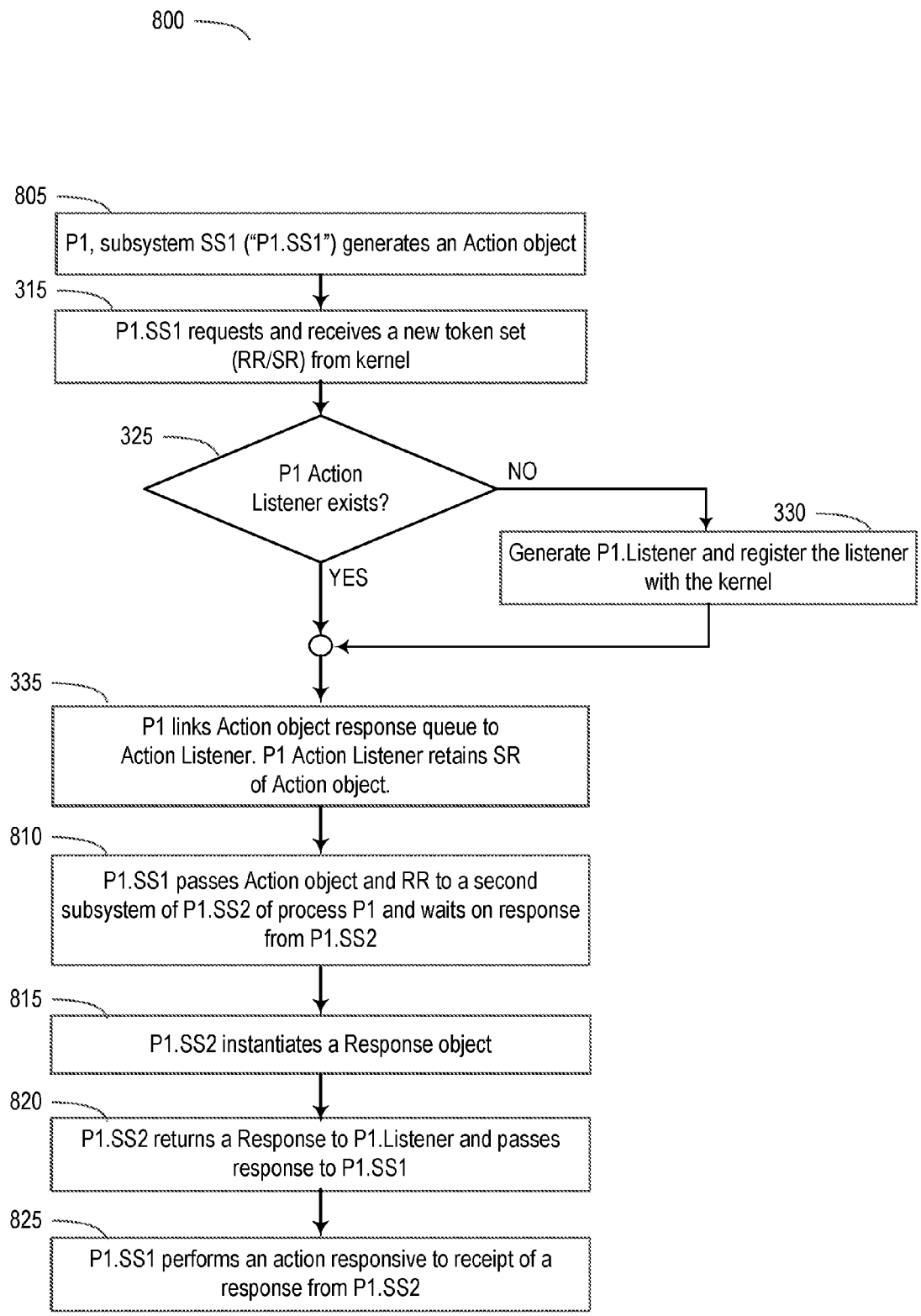
FIG. 8 illustrates a method 800 for tracking an object across subsystems within a process that guarantees a response in an efficient manner.

FIG. 8 illustrates, in block form, a method 800 for tracking an action object 111 across services within a process that guarantees a response in an efficient manner. In method 800, an action object generated in a first subsystem (SS1) of a process P1 can be used to receive a guaranteed response from a second subsystem (SS2) with process P1. For example, SS1 may need SS2 to initialize itself before SS1 can call SS2 to perform a service within P1. In the method 800, process SS2 does not yet need to perform work on behalf of SS1; SS1 simply needs a response to a message, such as an inquiry from SS1 to SS2 about the state of initialization of SS2. Since SS1 does not require work of SS2, the action object 111 does not need to be passed from SS1 to SS2 with P1; only the SS1.Response object needs to sent.

Method 800 begins at operation 805. Some operations of method 800, e.g. operations 315-335, were previously described above with reference to FIGS. 3A and 3B. Thus these operations are only briefly described here. Since the communications between SS1 and SS2 are within process P1, an IPC channel may be omitted in this embodiment.

In operation 805, process P1 can generate a new Action object 111 for SS1 that has a corresponding Response Object 122. A timeout value can represent a time at which SS1 should stop waiting on a response from SS2

In operation 315, process P1 can request a new token set SR/RR from kernel 140

In operation 320, P1.SS1 can encode Action object 111 and the first token (e.g., "RR") for passing to second SS2.

In operation 325, it can be determined whether process P1 has already generated an Action Listener 112 to listen for responses to one or more Action objects generated within process P1.

If, in operation 325, it was determined that first process P1 does not yet have an Action Listener generated that this Action object can use, then in operation 330 first process P1 can generate an Action Listener. In an embodiment, process P1 can register the Action Listener with kernel 140 to receive notifications associated with the token set assigned to Action object by kernel 140. If, in operation 325, it was determined that first process P1 already has an Action Listener, then method 300 resumes at operation 335.

In operation 335, first process P1 can link the response queue of Action object 111 into Action Listener 112. Action Listener 112 can retain the second token, e.g. "SR." in association with response queue of Action object 111.

In operation 810, subsystem SS1 passes the Action object 111 to SS2 and waits on a response from SS2. For example, SS1 may be waiting on SS2 to initialize itself before SS1 makes further calls to SS2.

In operation 815, SS2 instantiates a response object 122 for the action object. Since no action is required from SS2, other than a response, SS2 can optionally delete action object 111 after generating the response object 122.

In operation 820, SS2 can return a response to P1.Listener. P1.Listener can then pass the response to SS1. For example, receipt of a response by SS1 from SS2 can indicate that SS2 is initialized and ready to receive requests for work.

Figure 9:
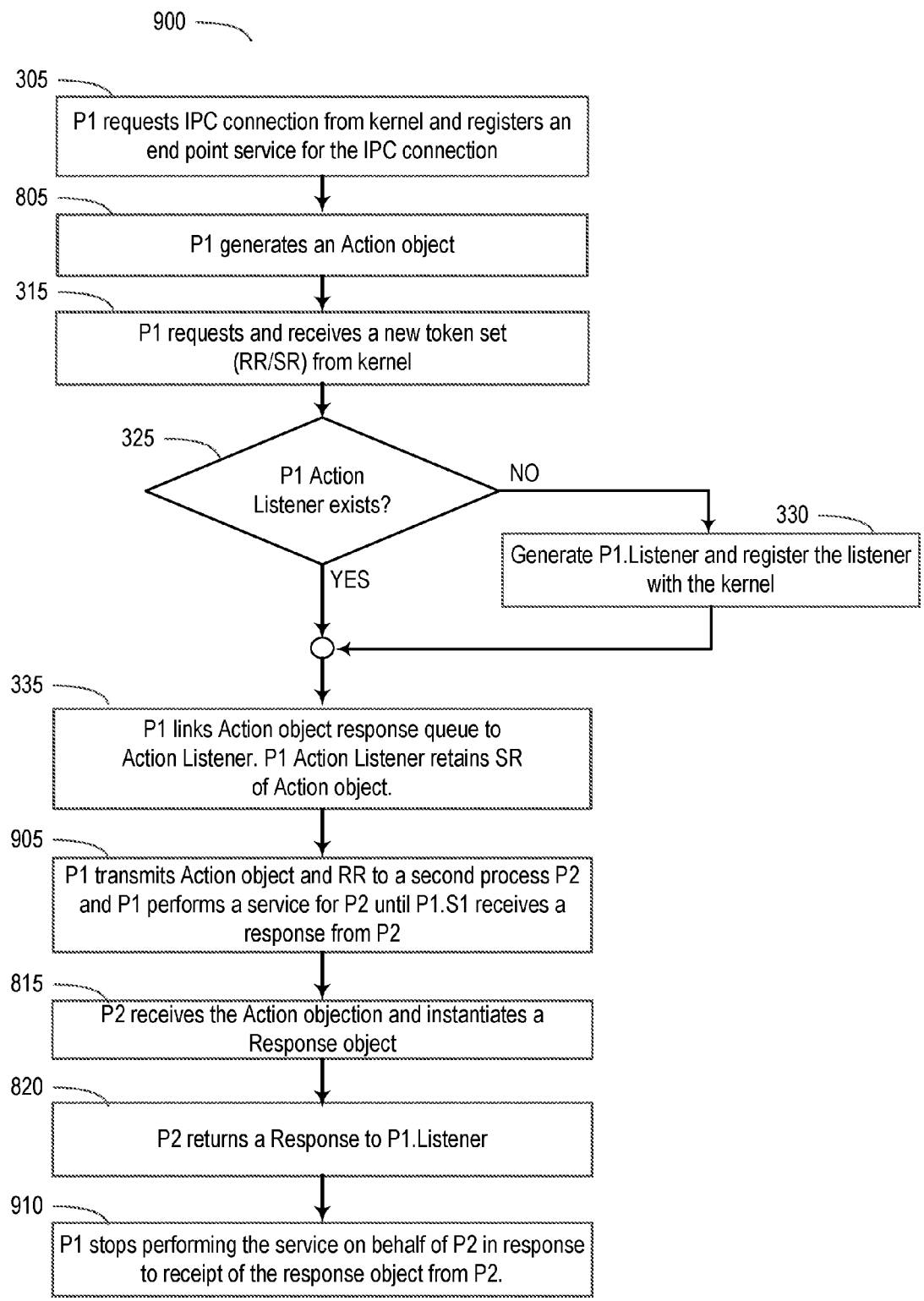
FIG. 9 illustrates, a method 900 wherein a process having a first service and a second service can ensure that the first service is notified when second service terminates, times out, or fails.

FIG. 9 illustrates, in block form, a method 900 wherein a first process can perform work on behalf of a second process, until the first process receives a response message that the second process has terminated, timed-out or failed. For example, a first process P1 can suppress notifications such as incoming email received, incoming text received, phone call received, that a user may want temporarily turned off. A "Do Not Disturb" mode can be initiated by a first process P1 on behalf of a second process P2, such as an exercise mode process. When the exercise mode of P2 terminates, fails, or times out, then process P1 end the Do Not Disturb Mode it was performing on behalf of P2. Thus, the Action object 111 provides a way for process P1 to continue performing a process on behalf of process P2, and P1 will be guaranteed a response from P2 that will allow P1 to terminate the work being performed on behalf of P2, even if P2 fails, terminates or times out.

Method 900 begins at operation 305. Some operations of method 900, e.g. operations 305 and 315-335, were previously described above with reference to FIGS. 3A and 3B. Thus these operations are only briefly described here.

In operation 305, a first process P1 can request an inter-process communication ("IPC") channel 141 from system kernel 140.

In operation 805, process P1 can generate a new Action object 111 for P1 that has a corresponding Response object 122.

In operation 315, process P1 can request a new token set SR/RR from kernel 140 for Action object 111.

In operation 320, P1 can encode Action object 111 and the first token (e.g., "RR") for passing to P2.

In operation 325, it can be determined whether process P1 has already generated an Action listener 112 to listen for responses to one or more Action objects generated within process P1.

If, in operation 325, it was determined that first process P1 does not yet have an Action listener generated that this Action object can use, then in operation 330 first process P1 can generate an Action Listener. In an embodiment, process P1 can register the Action listener with kernel 140 to receive notifications associated with the token set assigned to Action object by kernel 140. If, in operation 325, it was determined that first process P1 already has an Action listener, then method 300 resumes at operation 335.

In operation 335, first process P1 can link the response queue of Action object 111 into Action listener 112. Action listener 112 can retain the second token, e.g. "SR." in association with response queue of Action object 111.

In operation 905, P1 encodes the Action object 111 and RR token in a message and sends the message to process P2. P1 then waits on a response from P2. For example, P1 may be performing a "Do No Disturb" service, blocking certain notifications, on behalf of P2, and P1 is waiting for a notification from P2 that indicates when P1 can stop performing Do Not Disturb mode.

In operation 815, P2 receives the encoded message from P1 and instantiates a Response object 122 for the action object. Since no action is required from P2, other than a response, P2 can optionally delete Action object 111 after generating the Response object 122.

In operation 820, P2 can return a response to P1.Listener. P1.Listener can then pass the response to P1. For example, receipt of a response by P1 from P2 can indicate that P2 is finished being in exercise mode and P1 can stop performing the Do Not Disturb service for P2.

Figure 10:
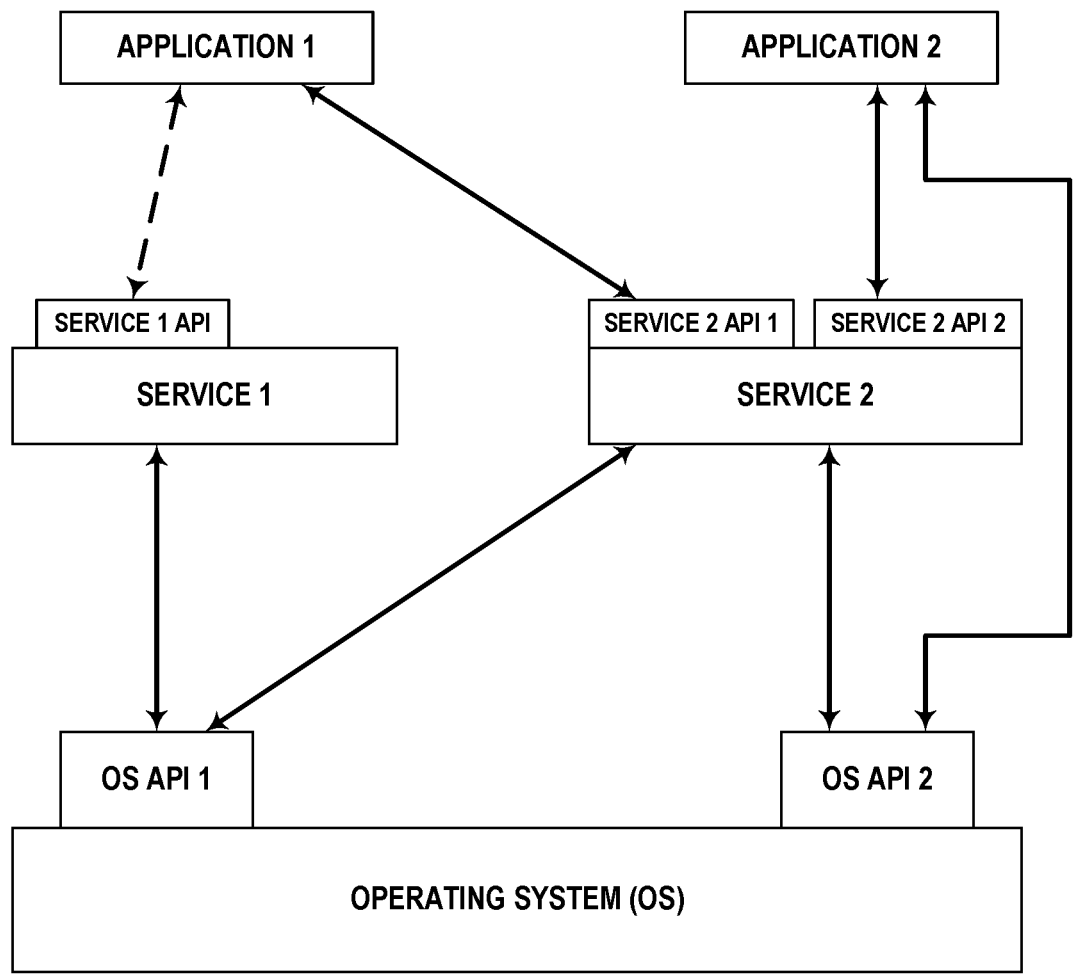
FIG. 10 illustrates an exemplary embodiment of a software stack usable in some embodiments of the invention.

In operation 910, P1 can stop perform the service on behalf of P2. In FIG. 10 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 11:
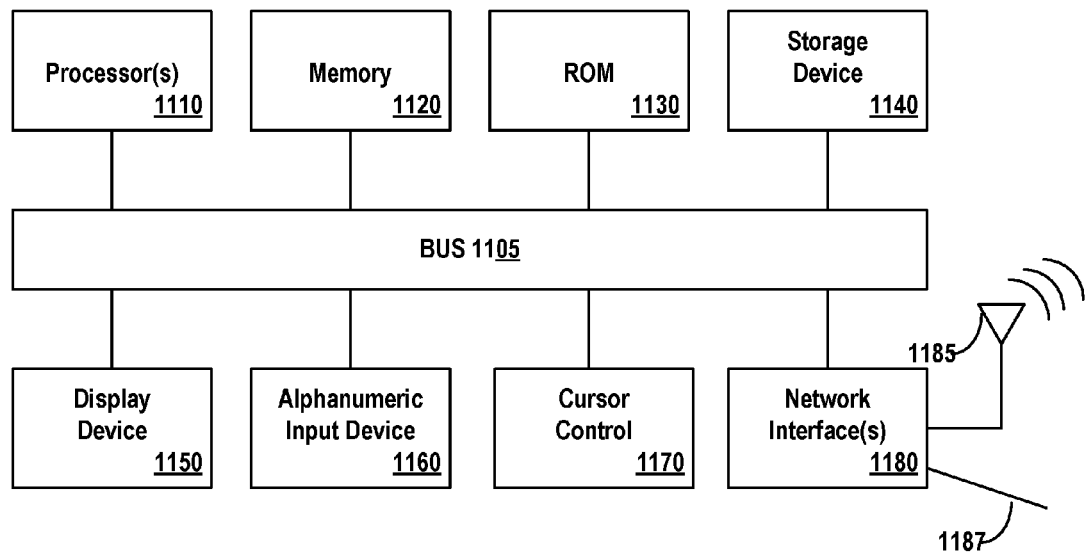
FIG. 11 is a block diagram of one embodiment of a computing system.

FIG. 11 is a block diagram of one embodiment of a computing system 1100. The computing system illustrated in FIG. 11 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 11 may be used to provide the computing device and/or the server device.

Computing system 1100 includes bus 1105 or other communication device to communicate information, and processor 1110 coupled to bus 1105 that may process information.

While computing system 1100 is illustrated with a single processor, computing system 1100 may include multiple processors and/or co-processors 1110. Computing system 1100 further may include random access memory (RAM) or other dynamic storage device 1120 (referred to as main memory), coupled to bus 1105 and may store information and instructions that may be executed by processor(s) 1110. Main memory 1120 may also be used to store temporary variables or other intermediate information during execution of instructions by processor 1110.

Computing system 1100 may also include read only memory (ROM) and/or other static storage device 1140 coupled to bus 1105 that may store static information and instructions for processor(s) 1110. Data storage device 1140 may be coupled to bus 1105 to store information and instructions. Data storage device 1140 such as flash memory or a magnetic disk or optical disc and corresponding drive may be coupled to computing system 1100.

Computing system 1100 may also be coupled via bus 1105 to display device 1150, such as a cathode ray tube (CRT) or liquid crystal display (LCD), to display information to a user. Computing system 1100 can also include an alphanumeric input device 1160, including alphanumeric and other keys, which may be coupled to bus 1105 to communicate information and command selections to processor(s) 1110. Another type of user input device is cursor control 1170, such as a touchpad, a mouse, a trackball, or cursor direction keys to communicate direction information and command selections to processor(s) 1110 and to control cursor movement on display 1150. Computing system 1100 may also receive user input from a remote device that is communicatively coupled to computing system 1100 via one or more network interfaces 1180.

Computing system 1100 further may include one or more network interface(s) 1180 to provide access to a network, such as a local area network. Network interface(s) 1180 may include, for example, a wireless network interface having antenna 1185, which may represent one or more antenna(e). Computing system 1200 can include multiple wireless network interfaces such as a combination of WiFi, Bluetooth® and cellular telephony interfaces. Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
generating, by a first process, an object representing an item of work to be performed by a remote process;
receiving, by the first process, a token set associated with the first process, the token set comprising a first token and a second token, wherein the first token is held by one process at a time;
transferring the object and the first token to the remote process for processing;
receiving by the first process, through an operating system kernel, the first token and a message;
validating the message utilizing the first token and second token associated with the first process and the object.

2. The method of claim 1, further comprising:
generating, by the first process, a listener object that is configured to receive the message, wherein the listener object holds the second token of the token set.

3. The method of claim 2, wherein the listener object is configured to validate the message received by comparing the received first token with the second token of the token set.

4. The method of claim 1, wherein the remote process comprises a third process, and the remote process received the first token and a copy of the object from a second, intervening process, and wherein the first token and the message comprising a response to the object are received by the first process, from the remote process, via the kernel, without passing the response through the second, intervening process.

5. The method of claim 1, wherein the kernel enforces the requirement that the first token is held by one process at a time, and wherein the association between the process, the first token, and the second token is maintained by the kernel.

6. The method of claim 1, further comprising:
registering the first process with the kernel in association with the token set to receive messages based on the token set;
wherein the receiving of the message, by the first process, is in response to one of:
the remote process terminating, and the message comprises a message from the kernel that the remote process has terminated, or
the remote process transferring the first token back to the first process, and the message comprises a response to the object, returned from the remote process;
routing the first token and the message to an object listener of the first process.

7. The method of claim 1, wherein the first token comprises a read right and the second token comprises a send right, the read right and send right forming a set generated by a kernel.

8. A non-transitory computer readable medium programmed with instructions that, when executed by a processing system, perform operations, comprising:
generating, by a first process, an object representing an item of work to be performed by a remote process;
receiving, by the first process, a token set associated with the first process, the token set comprising a first token and a second token, wherein the first token is held by one process at a time;
transferring the object and the first token to the remote process for processing;
receiving by the first process, through an operating system kernel, the first token and a message;
validating the message utilizing the first token and second token associated with the first process and the object.

9. The medium of claim 8, the operations further comprising:
generating, by the first process, a listener object that is configured to receive the message, wherein the listener object holds the second token of the token set.

10. The medium of claim 9, wherein the listener object is configured to validate the message received by comparing the received first token with the second token of the token set.

11. The medium of claim 8, wherein the remote process comprises a third process, and the remote process received the first token and a copy of the object from a second, intervening process, and wherein the first token and the message comprising a response to the object are received by the first process, from the remote process, via the kernel, without passing the response through the second, intervening process.

12. The medium of claim 8, wherein the kernel enforces the requirement that the first token is held by one process at a time, and wherein the association between the process, the first token, and the second token is maintained by the kernel.

13. The medium of claim 8, the operations further comprising:
registering the first process with the kernel in association with the token set to receive messages based on the token set;
wherein receiving a message, by the first process, is in response to one of:
the remote process terminating, and the message comprises a message from the kernel that the remote process has terminated, or
the remote process transferring the first token back to the first process, and the message comprises a response to the object, returned from the remote process; and
routing the first token and the message to an object listener of the first process.

14. The medium of claim 8, wherein the first token comprises a read right and the second token comprises a send right, the read right and send right forming a set generated by a kernel.

15. A system comprising:
a processing system coupled to a memory programmed with executable instructions that, when executed by the processing system perform operations, comprising:
generating, by a first process, an object representing an item of work to be performed by a remote process;
receiving, by the first process, a token set associated with the first process, the token set comprising a first token and a second token, wherein the first token is held by one process at a time;
transferring the object and the first token to the remote process for processing;
receiving by the first process, through an operating system kernel, the first token and a message;

validating the message utilizing the first token and second token associated with the first process and the object.

16. The system of claim 15, the operations further comprising:

generating, by the first process, a listener object that is configured to receive the message, wherein the listener object holds the second token of the token set.

17. The system of claim 16, wherein the listener object is configured to validate the message received by comparing the received first token with the second token of the token set.

18. The system of claim 15, wherein the remote process comprises a third process, and the remote process received the first token and a copy of the object from a second, intervening process, and wherein the first token and the message comprising a response to the object are received by the first process, from the remote process, via the kernel, without passing the response through the second, intervening process.

19. The system of claim 15, wherein the kernel enforces the requirement that the first token is held by one process at a time, and wherein the association between the process, the first token, and the second token is maintained by the kernel.

20. The system of claim 15, the operations further comprising:

registering the first process with the kernel in association with the token set to receive messages based on the token set;

wherein receiving a message, by the first process, is in response to one of:

the remote process terminating, and the message comprises a message from the kernel that the remote process has terminated, or the remote process transferring the first token back to the first process, and the message comprises a response to the object, returned from the remote process; and routing the first token and the message to an object listener of the first process.

21. The system of claim 15, wherein the first token comprises a read right and the second token comprises a send right, the read right and send right forming a set generated by a kernel.

* * * * *